United States Patent
Haggerty et al.

(10) Patent No.: US 8,417,612 B2
(45) Date of Patent: *Apr. 9, 2013

(54) USING COMMERCIAL SHARE OF WALLET TO RATE BUSINESS PROSPECTS

(75) Inventors: Kathleen Haggerty, Staten Island, NY (US); Charles Christopher Lyon, Phoenix, AZ (US); Benedict O. Okoh, New York, NY (US); Robert E. Phelan, Mendham, NJ (US); Jon Kevin Ruterman, Glendale, AZ (US); Geraldine A. Turner, Sandy Hook, VA (US); Chao M. Yuan, Montclair, NJ (US); Arnab Biswas, Calcutta (IN); Siddhartha Chatterji, New Delhi (IN)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/432,968

(22) Filed: Mar. 28, 2012

(65) Prior Publication Data

US 2012/0185297 A1 Jul. 19, 2012

Related U.S. Application Data

(63) Continuation of application No. 13/274,046, filed on Oct. 14, 2011, now Pat. No. 8,170,938, which is a continuation of application No. 12/103,394, filed on Apr. 15, 2008, now Pat. No. 8,073,752, which is a continuation of application No. 11/394,199, filed on Mar. 31, 2006, now abandoned, and a continuation-in-part of application No. 11/169,588, filed on Jun. 30, 2005, now Pat. No. 7,912,770, which is a continuation-in-part of application No. 10/978,298, filed on Oct. 29, 2004, now Pat. No. 7,788,147.

(60) Provisional application No. 60/704,428, filed on Aug. 2, 2005.

(51) Int. Cl.
*G06Q 40/00* (2012.01)
(52) U.S. Cl.
USPC .......................................................... 705/35
(58) Field of Classification Search ............... 705/35–45
See application file for complete search history.

(56) References Cited

U.S. PATENT DOCUMENTS

| | | |
|---|---|---|
| 5,966,699 A | 10/1999 | Zandi |
| 6,026,398 A | 2/2000 | Brown |
| 6,105,001 A | 8/2000 | Masi et al. |
| 6,658,412 B1 | 12/2003 | Jenkins et al. |
| 7,403,942 B1 | 7/2008 | Bayliss |
| 7,647,344 B2 | 1/2010 | Skurtovich et al. |

(Continued)

OTHER PUBLICATIONS

Examiner's Report dated Apr. 2, 2012 in Canadian Application No. 2,617,798.

(Continued)

*Primary Examiner* — Thomas M Hammond, III
(74) *Attorney, Agent, or Firm* — Snell & Wilmer L.L.P.

(57) ABSTRACT

Commercial size of spending wallet ("CSoSW") is the total business spend of a business including cash but excluding bartered items. Commercial share of wallet ("CSoW") is the portion of the spending wallet that is captured by a particular financial company. A modeling approach utilizes various data sources to provide outputs that describe a company's spend capacity. Research analysts can use CSoW/CSoSW to provide a comprehensive and robust indication of the business prospects of a rated company.

20 Claims, 25 Drawing Sheets

U.S. PATENT DOCUMENTS

| | | | |
|---|---|---|---|
| 7,657,540 | B1 | 2/2010 | Bayliss |
| 7,716,125 | B2 | 5/2010 | Shavit et al. |
| 7,890,420 | B2 | 2/2011 | Haggerty et al. |
| 7,912,842 | B1 | 3/2011 | Bayliss |
| 7,912,865 | B2 | 3/2011 | Akerman et al. |
| RE42,663 | E | 8/2011 | Lazarus et al. |
| 8,001,153 | B2 | 8/2011 | Skurtovich et al. |
| 8,065,264 | B1 | 11/2011 | Achanta |
| 8,239,250 | B2 | 8/2012 | Kalia et al. |
| 8,266,168 | B2 | 9/2012 | Bayliss |
| 8,275,770 | B2 | 9/2012 | Bayliss |
| 2001/0054022 | A1 | 12/2001 | Louie et al. |
| 2002/0029188 | A1 | 3/2002 | Schmid |
| 2002/0052884 | A1 | 5/2002 | Farber et al. |
| 2002/0073099 | A1 | 6/2002 | Gilbert et al. |
| 2002/0077964 | A1 | 6/2002 | Brody et al. |
| 2002/0123960 | A1 | 9/2002 | Ericksen |
| 2002/0178096 | A1 | 11/2002 | Marshall |
| 2002/0198688 | A1 | 12/2002 | Feldman |
| 2003/0130878 | A1 | 7/2003 | Kruk et al. |
| 2003/0171942 | A1 | 9/2003 | Gaito |
| 2004/0034570 | A1 | 2/2004 | Davis |
| 2004/0177030 | A1 | 9/2004 | Shoham |
| 2004/0177036 | A1 | 9/2004 | Nutahara et al. |
| 2005/0125334 | A1 | 6/2005 | Masella et al. |
| 2006/0282356 | A1 | 12/2006 | Andres et al. |
| 2010/0094910 | A1 | 4/2010 | Bayliss |
| 2011/0078011 | A1 | 3/2011 | Senghore et al. |
| 2012/0109734 | A1 | 5/2012 | Fordyce et al. |

OTHER PUBLICATIONS

Office Action dated May 7, 2012 in U.S. Appl. No. 13/032,427.
Office Action dated May 11, 2012 in U.S. Appl. No. 11/169,778.
Office Action dated May 14, 2012 in U.S. Appl. No. 13/356,270.
Office Action dated May 30, 2012 in U.S. Appl. No. 13/170,006.
Notice of Allowance dated Jun. 6, 2012 in U.S. Appl. No. 13/286,884.
Office Action received Jun. 12, 2012 in Mexican Application No. MX/a/2008/001717.
Office Action dated Jun. 14, 2012 in U.S. Appl. No. 13/432,890.
Office Action dated Jun. 14, 2012 in U.S. Appl. No. 12/144,506.
Notice of Allowance dated Jun. 22, 2012 in U.S. Appl. No. 13/170,006.
Office Action dated Jun. 26, 2012 in U.S. Appl. No. 12/984,801.
Advisory Action dated Jun. 27, 2012 in U.S. Appl. No. 13/209,035.
Office Action Action dated Jun. 27, 2012 in U.S. Appl. No. 12/465,837.
Notice of Allowance dated Apr. 4, 2012 in U.S. Appl. No. 11/608,179.
Office Action dated Apr. 12, 2012 in U.S. Appl. No. 13/286,884.
Final Office Action dated Apr. 16, 2012 in U.S. Appl. No. 13/209,035.
Office Action received Jun. 28, 2012 in Mexican Application No. MX/a/2007/012294.
Notice of Allowance dated Jul. 6, 2012 in U.S. Appl. No. 13/356,270.
Notice of Allowance dated Jul. 25, 2012 in U.S. Appl. No. 13/465,837.
Final Office Action dated Aug. 6, 2012 in U.S. Appl. No. 11/497,530.
Office Action dated Aug. 17, 2012 in U.S. Appl. No. 13/480,910.
Notice of Allowance dated Sep. 6, 2012 in U.S. Appl. No. 13/432,941.
Notice of Allowance dated Sep. 21, 2012 in U.S. Appl. No. 13/570,120.
Office Action dated Aug. 6, 2012 in U.S. Appl. No. 13/432,941.
Notice of Allowance dated Oct. 1, 2012 in U.S. Appl. No. 12/984,801.
Office Action dated Oct. 1, 2012 in U.S. Appl. No. 11/169,664.
Office Action dated Oct. 4, 2012 in U.S. Appl. No. 13/538,936.
Notice of Allowance dated Oct. 11, 2012 in U.S. Appl. No. 11/497,530.
Notice of Allowance dated Oct. 24, 2012 in U.S. Appl. No. 11/497,529.
Notice of Allowance dated Nov. 13, 2012 in U.S. Appl. No. 13/538,936.
Office Action dated Nov. 16, 2012 in U.S. Appl. No. 13/403,651.
Final Office Action dated Nov. 21, 2012 in U.S. Appl. No. 11/169,778.
Office Action dated Nov. 26, 2012 in U.S. Appl. No. 13/032,427.
Notice of Allowance dated Nov. 29, 2012 in U.S. Appl. No. 13/432,890.
Office Action dated Oct. 17, 2012 in U.S. Appl. No. 13/209,035.

1100

|  | | Predicted Paydown Percent | | | | |
|---|---|---|---|---|---|---|
|  | | <5% | 5-20% | 20-50% | 50%-80% | 80%+ |
| Actual paydown percent | <5% | 55604 | 12230 | 1359 | 31 | 0 |
| | 5-20% | 1314 | 5422 | 2282 | 54 | 1 |
| | 20-50% | 64 | 429 | 1835 | 333 | 13 |
| | 50%-80% | 1 | 41 | 492 | 301 | 53 |
| | 80%+ | 0 | 22 | 534 | 1236 | 429 |

|  | | Prediction | |
|---|---|---|---|
|  | | Revolver | Transactor |
| Actual | Revolver | 80539 | 432 |
| | Transactor | 1090 | 2019 |

|  | | Predict | |
|---|---|---|---|
|  | | No BT in | BT in |
| Actual | No BT in | 148,326 | 6,526 |
| | BT in | 9,534 | 9,832 |

| Dollar Figure | | Predicted Spending | | | | |
|---|---|---|---|---|---|---|
| | | <$500 | $500-1000 | $1000-2000 | $2000-5000 | >$5000 |
| Actual Spending | <$500 | 98,483 | 8,611 | 1,818 | 727 | 200 |
| | $500-1000 | 3,863 | 10,658 | 3,210 | 651 | 87 |
| | $1000-2000 | 2,220 | 2,474 | 7,192 | 2,727 | 245 |
| | $2000-5000 | 2,457 | 1,373 | 4,390 | 11,197 | 1,236 |
| | >$5000 | 520 | 336 | 1,011 | 3,512 | 5,020 |

| Dollar Figure | | Predicted Spending | | | | |
|---|---|---|---|---|---|---|
| | | <$500 | $500-1000 | $1000-2000 | $2000-5000 | >$5000 |
| Actual Spending | <$500 | 116,821 | 7,388 | 2,521 | 1,269 | 98 |
| | $500-1000 | 6,118 | 15,455 | 6,908 | 1,635 | 70 |
| | $1000-2000 | 3,074 | 8,383 | 31,477 | 5,794 | 181 |
| | $2000-5000 | 826 | 2,200 | 9,052 | 36,441 | 797 |
| | >$5000 | 7 | 19 | 95 | 838 | 2,880 |

|  |  | Predicted Average Monthly Spending | | | | |
|---|---|---|---|---|---|---|
|  |  | <$500 | $500-1000 | $1000-2000 | $2000-5000 | >$5000 |
| Actual Spending | <$500 | 524,328 | 36,853 | 9,116 | 3,083 | 481 |
|  | $500-1000 | 25,942 | 104,009 | 17,292 | 3,304 | 280 |
|  | $1000-2000 | 8,478 | 20,132 | 82,363 | 10,722 | 583 |
|  | $2000-5000 | 3,574 | 4,125 | 15,852 | 57,077 | 2,250 |
|  | >$5000 | 557 | 399 | 1,184 | 4,624 | 8,323 |

| Rank Order | | Predicted Spending | |
|---|---|---|---|
|  |  | below 10% (< $1950) | top 10% (> $1950) |
| Actual Spending | below 10% (< $2050) | 827,716 | 22,721 |
|  | top 10% (>$2050) | 22,721 | 71,773 |

|  |  | Predicted Annual Total Spending ||||
|---|---|---|---|---|---|
|  |  | <$10K | $10K-20K | $20-50K | >$50K |
| Actual Annual Total Spending | <$10K | 656,404 | 34,314 | 6,628 | 340 |
| | $10K-20K | 31,931 | 87,143 | 12,818 | 170 |
| | $20-50K | 3,390 | 21,242 | 68,009 | 1,715 |
| | >$50K | 112 | 582 | 7,525 | 9,018 |

| Rank Order || Predicted Annual Total Spending ||||
|---|---|---|---|---|---|
| | | Below top 20% (<$13K) | Top 10-20% ($13K-21.5K) | Top 5-10% ($21.5K-30.4K) | Top 5% (>$30.4K) |
| Actual Annual Total Spending | Below top 20% (<$13K) | 720,160 | 24,610 | 5,334 | 2,629 |
| | Top 10-20% ($13K-22.5K) | 27,338 | 51,082 | 7,477 | 2,366 |
| | Top 5-10% ($22.5K-32.9K) | 3,994 | 13,907 | 22,778 | 4,182 |
| | Top 5% (>$32.9K) | 1,483 | 4,625 | 11,473 | 37,885 |

| A B C IMPORT & EXPORT, INC.<br>Income Statement<br>For the Period Ended December 31, 2002 | | |
|---|---:|---:|
| | 12 Months Ended<br>Dec 31, 2002 | Pct. of<br>Revenue |
| Revenue | | |
| Sales | $ 6,349,354.98 | 100.00 |
| Total Revenue | $ 6,349,354.98 | 100.00 |
| Cost of Sales | | |
| Purchases | $ 5,934,380.03 | 93.46 |
| Freight-In | $ 35,701.94 | 0.56 |
| Total Cost of Sales | $ 5,970,081.97 | 94.03 |
| Gross Profit | $ 379,273.01 | 5.97 |
| Operating Expenses | | |
| Auto Expenses | $ 6,982.38 | 0.11 |
| Alarm Service | $ 240.40 | 0.00 |
| Computer Services | $ 69.94 | 0.00 |
| Delivery | $ 2,685.39 | 0.04 |
| Depreciation Expense | $ 8,531.00 | 0.13 |
| Donations | $ 100.00 | 0.00 |
| Bank Charges | $ 855.28 | 0.01 |
| Bad Debt | $ 32,017.00 | 0.50 |
| Casual Labor | $ 250.00 | 0.00 |
| Insurance – Auto | $ 2,492.80 | 0.04 |
| Insurance – Other | $ 15,931.20 | 0.25 |
| Rental & Lease | $ 3,342.67 | 0.05 |
| Payroll Taxes | $ 12,858.19 | 0.20 |
| Interest Expense | $ 20,046.21 | 0.32 |
| Maintenance & Repairs | $ 10,652.50 | 0.17 |
| Office Expense & Supplies | $ 12,349.23 | 0.19 |
| Wages | $ 113,139.20 | 1.78 |
| Licenses & Taxes | $ 23,212.71 | 0.37 |
| Utilities | $ 7,325.97 | 0.12 |
| Professional Fees – Accounting | $ 2,700.00 | 0.04 |
| Telephone & Telegraph | $ 9,685.25 | 0.15 |
| Total Expenses | $ 285,467.32 | 4.50 |
| Operating Income | $ 93,805.69 | 1.48 |
| Interest Income | $ 2,181.51 | 0.03 |
| Total Other Income | $ 2,181.51 | 0.03 |
| Net Income (Loss) | $ 95,987.20 | 1.51 |

FIG. 26

| VARIABLE | TRANSFORMATION | DIRECTION OF RELATIONSHIP TO COMMERCIAL SoSW |
|---|---|---|
| ANNUAL SALES AMOUNT | LINEAR | POSITIVE |
| NUMBER OF EMPLOYEES | LINEAR | POSITIVE |
| HIGHEST CREDIT AMOUNT WITHIN LAST 13 MONTHS | LINEAR | POSITIVE |
| TOTAL DOLLAR AMOUNT OF SATISFACTORY FINANCIAL EXPERIENCES OVER LAST 13 MONTHS | LOG | POSITIVE |
| FINANCIAL STRESS SCORE (0=HIGHEST RISK, 100=LOWEST RISK) | LINEAR | NEGATIVE |

ADJUSTED R-SQUARE = 0.3456

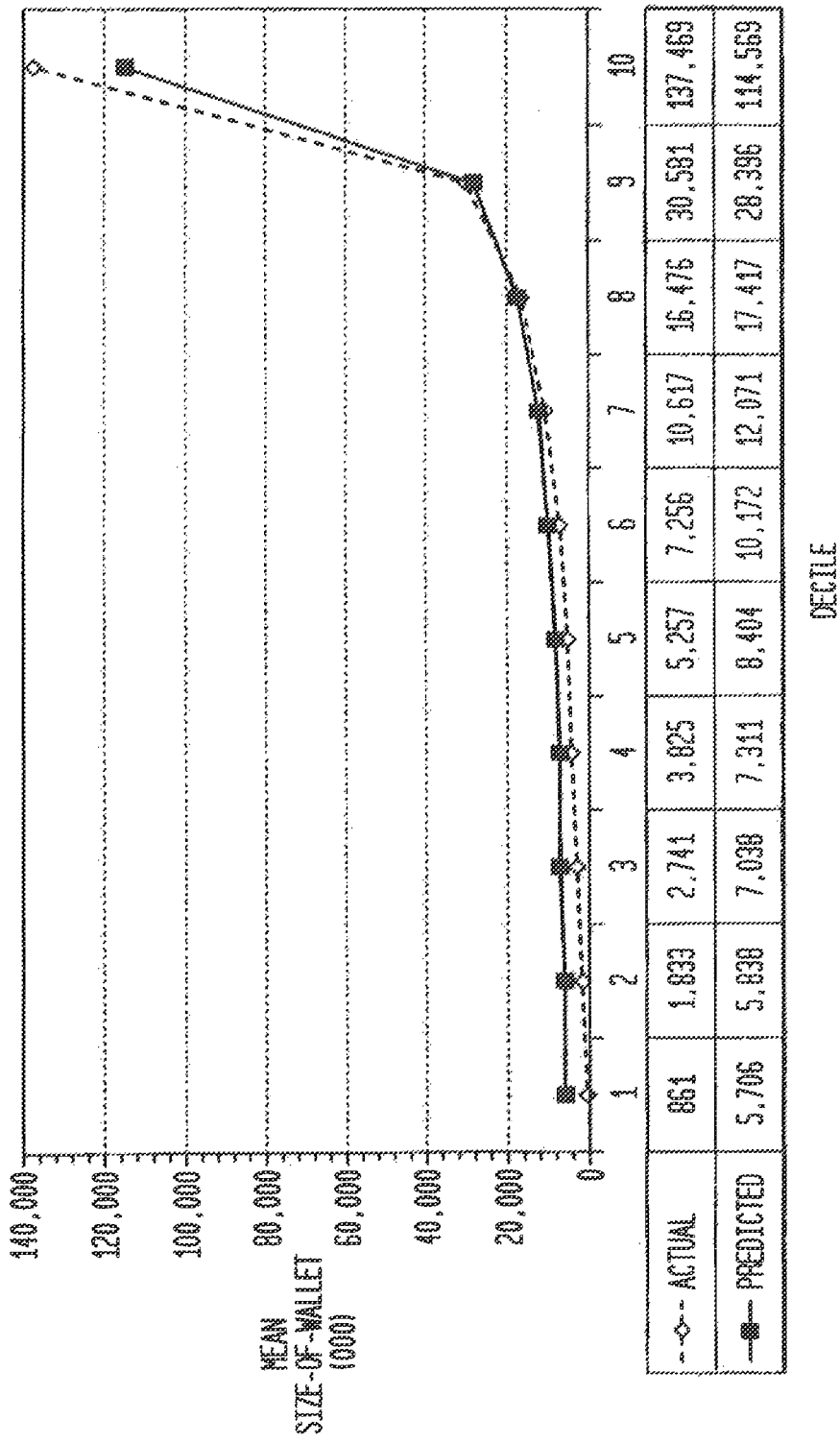

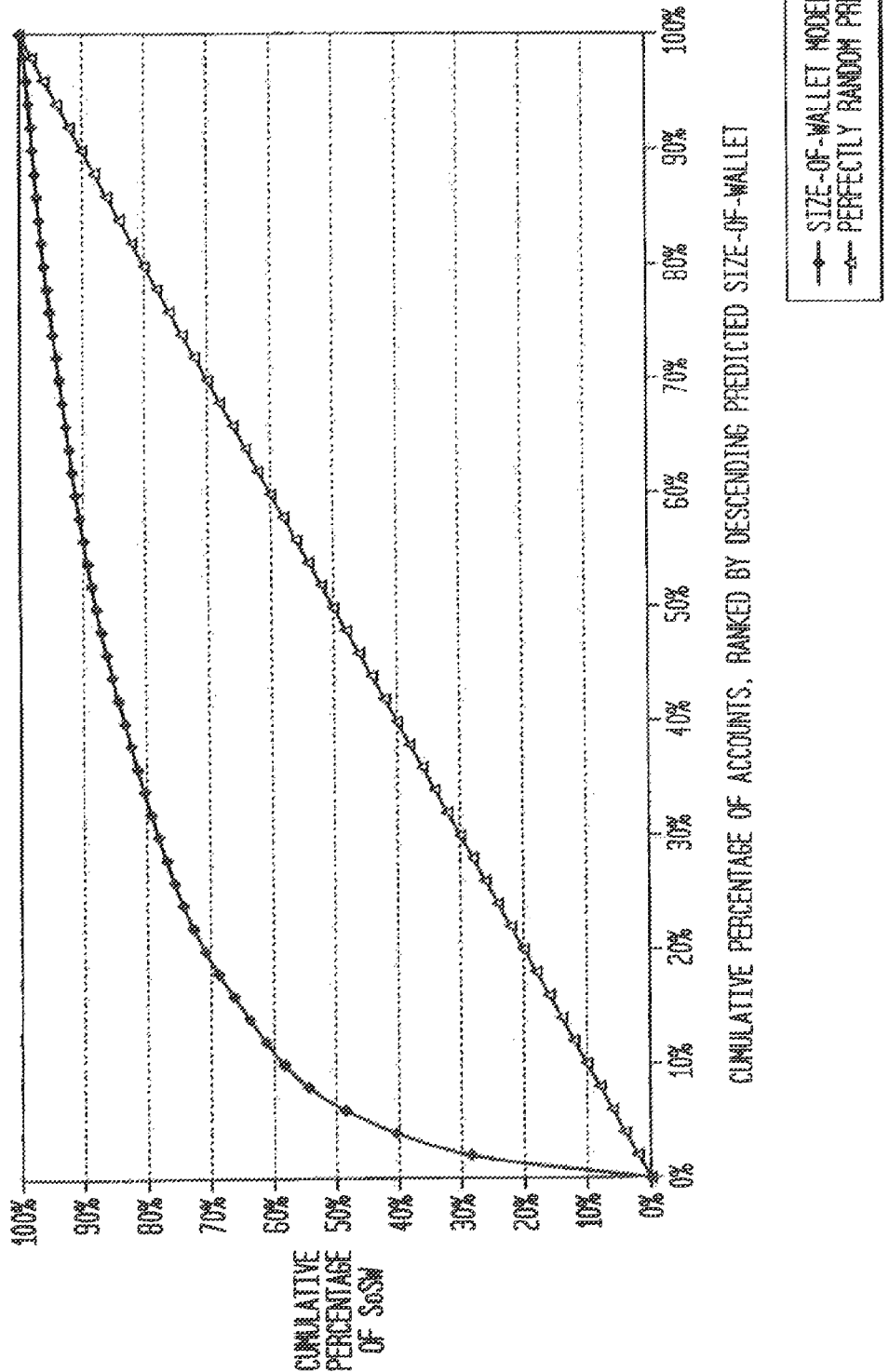

FIG. 31

| AVG MONTHLY OSBN SPEND | PREDICTED COMMERCIAL SoSW QUINTILE | | | | |
|---|---|---|---|---|---|
| | Q1 | Q2 | Q3 | Q4 | Q5 |
| LOW ($0 - $263) | 13,702 | 11,993 | 11,630 | 11,449 | 9,831 |
| MED ($263 - $1,460) | 16,277 | 15,201 | 14,075 | 12,831 | 10,622 |
| HIGH ($1,460 - $4.6MM) | 26,748 | 29,516 | 31,005 | 32,446 | 36,262 |

USING COMMERCIAL SHARE OF WALLET TO RATE BUSINESS PROSPECTS

CROSS-REFERENCE TO RELATED APPLICATIONS

This application is a continuation of and claims priority to U.S. patent application Ser. No. 13/274,046, entitled, "USING COMMERCIAL SHARE OF WALLET TO RATE BUSINESS PROSPECTS," and filed Oct. 14, 2011. The '046 application is a continuation of and claims priority to U.S. patent application Ser. No. 12/103,394, entitled, "USING COMMERCIAL SHARE OF WALLET TO RATE BUSINESS PROSPECTS," and filed Apr. 15, 2008 which issued as U.S. Pat. No. 8,073,752 on Dec. 6, 2011. The '394 application is a continuation of U.S. patent application Ser. No. 11/394,199, filed Mar. 31, 2006. The '199 application claims the benefit of U.S. Provisional Application No. 60/704,428, filed Aug. 2, 2005. U.S. patent application Ser. No. 11/394,199, filed Mar. 31, 2006, is also a continuation-in-part of U.S. patent application Ser. No. 11/169,588, filed Jun. 30, 2005 which issued as U.S. Pat. No. 7,912,770 on Mar. 22, 2011. The '588 application is a continuation-in-part of U.S. patent application Ser. No. 10/978,298, filed Oct. 29, 2004 which issued as U.S. Pat. No. 7,788,147 on Aug. 31, 2010. Each of the aforementioned applications are incorporated by reference herein in their entirety.

BACKGROUND OF THE INVENTION

1. Field of the Invention

This disclosure generally relates to financial data processing, and in particular it relates to credit scoring, customer profiling, customer product offer targeting, commercial credit behavior analysis and modeling.

2. Background Art

For the purposes of this disclosure, middle market commercial entities, service establishments, franchises, small business corporations and partnerships as well as business sole proprietorships will be defined as businesses. The term "businesses" also includes principals of a business entity. It is axiomatic that consumers and/or businesses will tend to spend more when they have greater purchasing power. The capability to accurately estimate a business's or a consumer's spend capacity could therefore allow a financial institution (such as a credit company, lender or any consumer or business services companies) to better target potential prospects and identify any opportunities to increase business to business ("B2B") or business to consumer ("B2C") transaction volumes, without an undue increase in the risk of defaults. Attracting additional consumer and/or commercial spending in this manner, in turn, would increase such financial institution's revenues, primarily in the form of an increase in transaction fees and interest payments received. Consequently, a model that can accurately estimate purchasing power is of paramount interest to many financial institutions and other financial services companies.

A limited ability to estimate spend behavior for goods and services that a business or consumer purchases has previously been available. A financial institution can, for example, simply monitor the balances of its own customers' accounts. When a credit balance is lowered, the financial institution could then assume that the corresponding customer now has greater purchasing power. However, it is often difficult to confirm whether the lowered balance is the result of a balance transfer to another account. Such balance transfers represent no increase in the customer's capacity to spend, and so this simple model of customer behavior has its flaws.

In order to achieve a complete picture of any customer's purchasing ability, one must examine in detail the full range of a customer's financial accounts, including credit accounts, checking and savings accounts, investment portfolios, and the like. However, the vast majority of customers do not maintain all such accounts with the same financial institution and the access to detailed financial information from other financial institutions is restricted by privacy laws, disclosure policies and security concerns.

There is limited and incomplete consumer information from credit bureaus and the like at the aggregate and individual consumer levels. Since balance transfers are nearly impossible to consistently identify from the face of such records, this information has not previously been enough to obtain accurate estimates of a consumer's actual spending ability.

Similarly, it would be useful for a financial institution to identify spend availability for corporate consumers, such as businesses and/or a principal of a business entity. Such an identification would allow the financial institution to accurately target the corporate businesses and/or principals most likely to have spend availability, and those most likely to increase their plastic spend on transactional accounts related to the financial institution. However, there is also limited data on corporate spend information, and identifying and predicting the size and share of a corporate wallet is difficult.

Accordingly, there is a need for a method and apparatus for modeling individual and corporate consumer spending behavior which addresses certain problems of existing technologies.

BRIEF SUMMARY OF THE INVENTION

A method for modeling customer behavior can be applied to both potential and actual customers (who may be individual consumers or businesses) to determine their spend over previous periods of time (sometimes referred to herein as the customer's size of wallet) from tradeline data sources. The share of wallet by tradeline or account type may also be determined. At the highest level, the size of wallet is represented by a consumer's or business' total aggregate spending and the share of wallet represents how the customer uses different payment instruments.

In various embodiments, a method and apparatus for modeling consumer or business behavior includes receiving individual and aggregated customer data for a plurality of different customers. The customer data may include, for example, time series tradeline data, business financial statement data, business or consumer panel data, and internal customer data. One or more models of consumer or business spending patterns are then derived based on the data for one or more categories of consumer or business. Categories may be based on spending levels, spending behavior, tradeline user and type of tradeline.

In various embodiments, a method and apparatus for estimating the spending levels of an individual consumer is next provided, which relies on the models of consumer behavior above. Size of wallet calculations for individual prospects and customers are derived from credit bureau data sources to produce outputs using the models.

Balance transfers into credit accounts are identified based on tradeline data according to various algorithms, and any identified balance transfer amount is excluded from the spending calculation. The identification of balance transfers enables more accurate utilization of balance data to reflect spending.

When spending levels are reliably identified in this manner, customers may be categorized to more effectively manage the customer relationship and increase the profitability therefrom. For example, share of wallet scores can be used as a parameter for determining whether or not to guarantee a check. The share of wallet can be used to differentiate between a low-risk customer who is writing more checks because his income has probably increased, and a high-risk customer who is writing more checks without a corresponding increase in income or spend.

Similarly, company financial statement data can be utilized to identify and calculate the total business spend of a company that could be transacted using a commercial credit card. A spend-like regression model can then be developed to estimate annual commercial size of spending wallet values for customers and prospects of a credit network. This approach relies on the High Balance Reunderwriting Unit ("HBRU") database of commercially-underwritten businesses and the publicly available tax statistics section of the IRS website, among other sources, to obtain accurate financial statement data for companies across various industries. Once the size of a company's spending wallet has been determined, the cardable share of the company's wallet may also be estimated.

Research analysts can use this information to provide a comprehensive and robust indication of the business prospects of a rated company.

BRIEF DESCRIPTION OF THE DRAWINGS/FIGURES

Further aspects of the present disclosure will be more readily appreciated upon review of the detailed description of its various embodiments, described below, when taken in conjunction with the accompanying drawings, of which:

FIG. 11-19 are tables showing exemplary results and outputs of the process of FIG. 6 against a sample consumer population.

FIG. 22 is a sample financial statement that may be analyzed using the method of FIG. 21.

FIG. 26 is a table describing the relationship between a commercial SoSW model according to an embodiment of the invention and business variables.

FIG. 27 is a graph comparing actual commercial SoSW results to predicted commercial SoSW estimates according to an embodiment of the present invention.

FIG. 28 is a graph comparing a commercial SoSW model according to an embodiment of the present invention to a perfectly random prediction.

FIG. 31 is a table displaying customer counts in a scored output file according to an embodiment of the present invention.

DETAILED DESCRIPTION OF THE INVENTION

Figure 1:
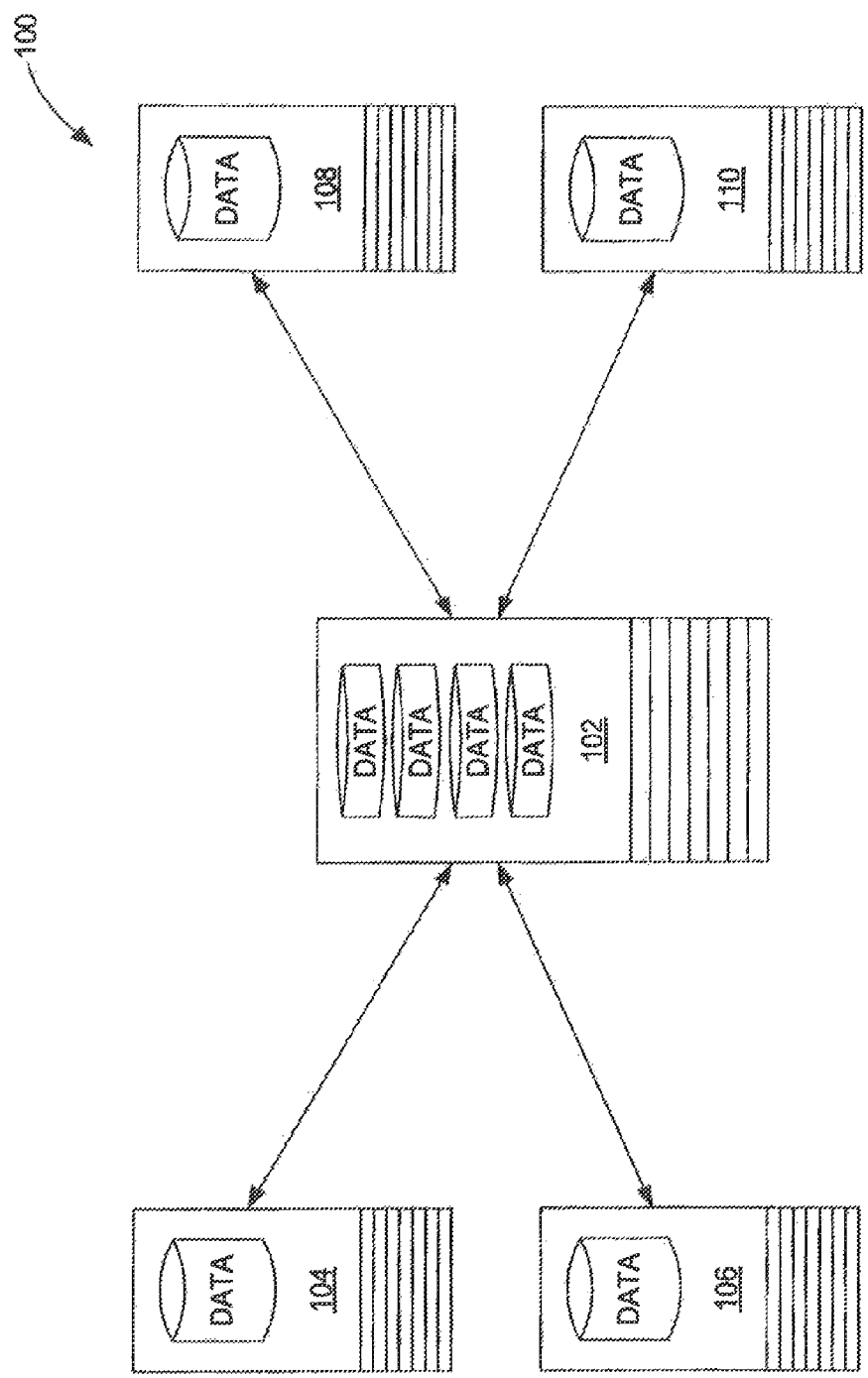
FIG. 1 is a block diagram of an exemplary financial data exchange network over which the processes of the present disclosure may be performed.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

In an aspect of this invention, the term "business" will refer to non-publicly traded business entities, such as middle market commercial entities, franchises, small business corporations and partnerships, and sole proprietorships, as well as principals of these business entities. One of skill in the pertinent art will recognize that the present invention may be used in reference to consumers, businesses, and publicly traded companies without departing from the spirit and scope of the present invention.

As used herein, the following terms shall have the following meanings. A consumer refers to an individual consumer and/or a small business. A trade or tradeline refers to a credit or charge vehicle issued to an individual customer by a credit grantor. Types of tradelines include, for example and without limitation, bank loans, credit card accounts, retail cards, personal lines of credit and car loans/leases. For purposes here, use of the term credit card shall be construed to include charge cards except as specifically noted. Tradeline data describes the customer's account status and activity, including, for example, names of companies where the customer has accounts, dates such accounts were opened, credit limits, types of accounts, balances over a period of time and summary payment histories. Tradeline data is generally available for the vast majority of actual consumers. Tradeline data, however, does not include individual transaction data, which is largely unavailable because of consumer privacy protections. Tradeline data may be used to determine both individual and aggregated consumer spending patterns, as described herein.

Consumer panel data measures consumer spending patterns from information that is provided by, typically, millions of participating consumer panelists. Such consumer panel data is available through various consumer research companies, such as comScore Networks, Inc. of Reston, Va. Consumer panel data may typically include individual consumer information such as credit risk scores, credit card application data, credit card purchase transaction data, credit card statement views, tradeline types, balances, credit limits, purchases, balance transfers, cash advances, payments made, finance charges, annual percentage rates and fees charged. Such individual information from consumer panel data, however, is limited to those consumers who have participated in the consumer panel, and so such detailed data may not be available for all consumers.

Although embodiments of the invention herein may be described as relating to individual consumers, one of skill in the pertinent art(s) will recognize that they can also apply to small businesses and organizations or principals thereof without departing from the spirit and scope of the present invention.

I. CONSUMER PANEL DATA AND MODEL DEVELOPMENT/VALIDATION

Technology advances have made it possible to store, manipulate and model large amounts of time series data with minimal expenditure on equipment. As will now be described, a financial institution may leverage these technological advances in conjunction with the types of consumer data presently available in the marketplace to more readily estimate the spend capacity of potential and actual customers. A reliable capability to assess the size of a consumer's wallet is introduced in which aggregate time series and raw tradeline data are used to model consumer behavior and attributes, and identify categories of consumers based on aggregate behavior. The use of raw trade-line time series data, and modeled consumer behavior attributes, including but not limited to, consumer panel data and internal consumer data, allows actual consumer spend behavior to be derived from point in time balance information.

In addition, the advent of consumer panel data provided through internet channels provides continuous access to actual consumer spend information for model validation and refinement. Industry data, including consumer panel information having consumer statement and individual transaction data, may be used as inputs to the model and for subsequent verification and validation of its accuracy. The model is developed and refined using actual consumer information with the goals of improving the customer experience and increasing billings growth by identifying and leveraging increased consumer spend opportunities.

A credit provider or other financial institution may also make use of internal proprietary customer data retrieved from its stored internal financial records. Such internal data provides access to even more actual customer spending information, and may be used in the development, refinement and validation of aggregated consumer spending models, as well as verification of the models' applicability to existing individual customers on an ongoing basis.

While there has long been market place interest in understanding spend to align offers with consumers and assign credit line size, the holistic approach of using a size of wallet calculation across customers' lifecycles (that is, acquisitions through collections) has not previously been provided. The various data sources outlined above provide the opportunity for unique model logic development and deployment, and as described in more detail in the following, various categories of consumers may be readily identified from aggregate and individual data. In certain embodiments of the processes disclosed herein, the models may be used to identify specific types of consumers, nominally labeled 'transactors' and 'revolvers,' based on aggregate spending behavior, and to then identify individual customers and prospects that fall into one of these categories. Consumers falling into these categories may then be offered commensurate purchasing incentives based on the model's estimate of consumer spending ability.

Referring now to FIGS. 1-19, wherein similar components of the present disclosure are referenced in like manner, various embodiments of a method and system for estimating the purchasing ability of consumers will now be described in detail.

Turning now to FIG. 1, there is depicted an exemplary computer network 100 over which the transmission of the various types of consumer data as described herein may be accomplished, using any of a variety of available computing components for processing such data in the manners described below. Such components may include an institution computer 102, which may be a computer, workstation or server, such as those commonly manufactured by IBM, and operated by a financial institution or the like. The institution computer 102, in turn, has appropriate internal hardware, software, processing, memory and network communication components that enables it to perform the functions described here, including storing both internally and externally obtained individual or aggregate consumer data in appropriate memory and processing the same according to the processes described herein using programming instructions provided in any of a variety of useful machine languages.

The institution computer 102 may in turn be in operative communication with any number of other internal or external computing devices, including for example components 104, 106, 108, and 110, which may be computers or servers of similar or compatible functional configuration. These components 104-110 may gather and provide aggregated and individual consumer data, as described herein, and transmit the same for processing and analysis by the institution computer 102. Such data transmissions may occur for example over the Internet or by any other known communications infrastructure, such as a local area network, a wide area network, a wireless network, a fiber-optic network, or any combination or interconnection of the same. Such communications may also be transmitted in an encrypted or otherwise secure format, in any of a wide variety of known manners.

Each of the components 104-110 may be operated by either common or independent entities. In one exemplary embodiment, which is not to be limiting to the scope of the present disclosure, one or more such components 104-110 may be operated by a provider of aggregate and individual consumer tradeline data, an example of which includes services provided by Experian Information Solutions. Inc. of Costa Mesa, Calif. ("Experian"). Tradeline level data preferably includes up to 24 months or more of balance history and credit attributes captured at the tradeline level, including information about accounts as reported by various credit grantors, which in turn may be used to derive a broad view of actual aggregated consumer behavioral spending patterns.

Alternatively, or in addition thereto, one or more of the components 104-110 may likewise be operated by a provider of individual and aggregate consumer panel data, such as commonly provided by comScore Networks, Inc. of Reston, Va. ("comScore"). Consumer panel data provides more detailed and specific consumer spending information regarding millions of consumer panel participants, who provide actual spend data to collectors of such data in exchange for various inducements. The data collected may include any one or more of credit risk scores, online credit card application data, online credit card purchase transaction data, online credit card statement views, credit trade type and credit issuer, credit issuer code, portfolio level statistics, credit bureau reports, demographic data, account balances, credit limits, purchases, balance transfers, cash advances, payment amounts, finance charges, annual percentage interest rates on accounts, and fees charged, all at an individual level for each of the participating panelists. In various embodiments, this type of data is used for model development, refinement and verification. This type of data is further advantageous over tradeline level data alone for such purposes, since such detailed information is not provided at the tradeline level. While such detailed consumer panel data can be used alone to generate a model, it may not be wholly accurate with respect to the remaining marketplace of consumers at large without further refinement. Consumer panel data may also be used to generate aggregate consumer data for model derivation and development.

Additionally, another source of inputs to the model may be internal spend and payment history of the institution's own customers. From such internal data, detailed information at the level of specificity as the consumer panel data may be obtained and used for model development, refinement and validation, including the categorization of consumers based on identified transactor and revolver behaviors.

Figure 2:
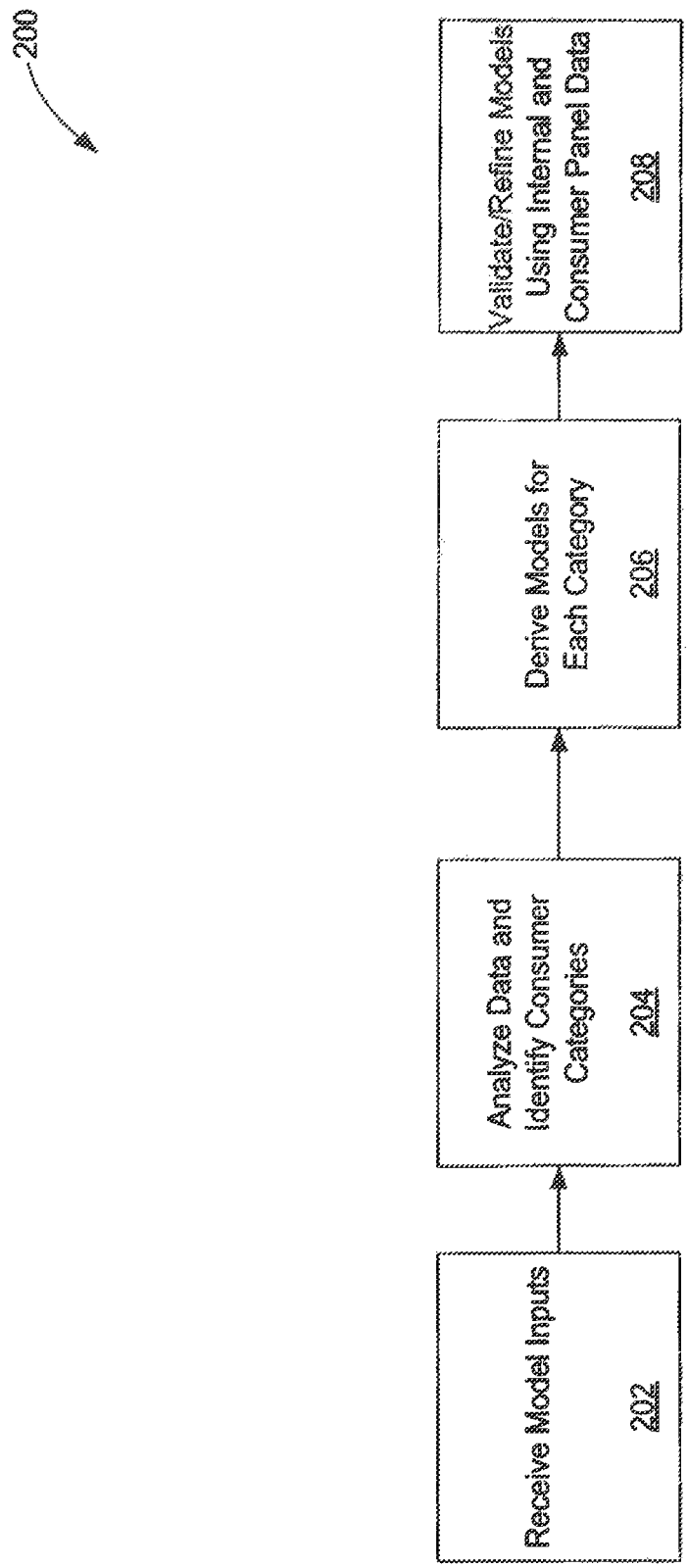
FIG. 2 is a flowchart of an exemplary consumer modeling process performed by the financial server of FIG. 1.

Turning now to FIG. 2, there is depicted a flowchart of an exemplary process 200 for modeling aggregate consumer behavior in accordance with the present disclosure. The process 200 commences at step 202 wherein individual and aggregate consumer data, including time-series tradeline data, consumer panel data and internal customer financial data, is obtained from any of the data sources described previously as inputs for consumer behavior models. In certain embodiments, the individual and aggregate consumer data may be provided in a variety of different data formats or structures and consolidated to a single useful format or structure for processing.

Next, at step 204, the individual and aggregate consumer data is analyzed to determine consumer spending behavior patterns. One of ordinary skill in the art will readily appreciate that the models may include formulas that mathematically describe the spending behavior of consumers. The particular formulas derived will therefore highly depend on the values resulting from customer data used for derivation, as will be readily appreciated. However, by way of example only and based on the data provided, consumer behavior may be modeled by first dividing consumers into categories that may be based on account balance levels, demographic profiles, household income levels or any other desired categories. For each of these categories in turn, historical account balance and transaction information for each of the consumers may be tracked over a previous period of time, such as one to two years. Algorithms may then be employed to determine formulaic descriptions of the distribution of aggregate consumer information over the course of that period of time for the population of consumers examined, using any of a variety of known mathematical techniques. These formulas in turn may be used to derive or generate one or more models (step 206) for each of the categories of consumers using any of a variety of available trend analysis algorithms. The models may yield the following types of aggregated consumer information for each category: average balances, maximum balances, standard deviation of balances, percentage of balances that change by a threshold amount, and the like.

Finally, at step 208, the derived models may be validated and periodically refined using internal customer data and consumer panel data from sources such as comScore. In various embodiments, the model may be validated and refined over time based on additional aggregated and individual consumer data as it is continuously received by an institution computer 102 over the network 100. Actual customer transaction level information and detailed consumer information panel data may be calculated and used to compare actual consumer spend amounts for individual consumers (defined for each month as the difference between the sum of debits to the account and any balance transfers into the account) and the spend levels estimated for such consumers using the process 200 above. If a large error is demonstrated between actual and estimated amounts, the models and the formulas used may be manually or automatically refined so that the error is reduced. This allows for a flexible model that has the capability to adapt to actual aggregated spending behavior as it fluctuates over time.

Figure 3:
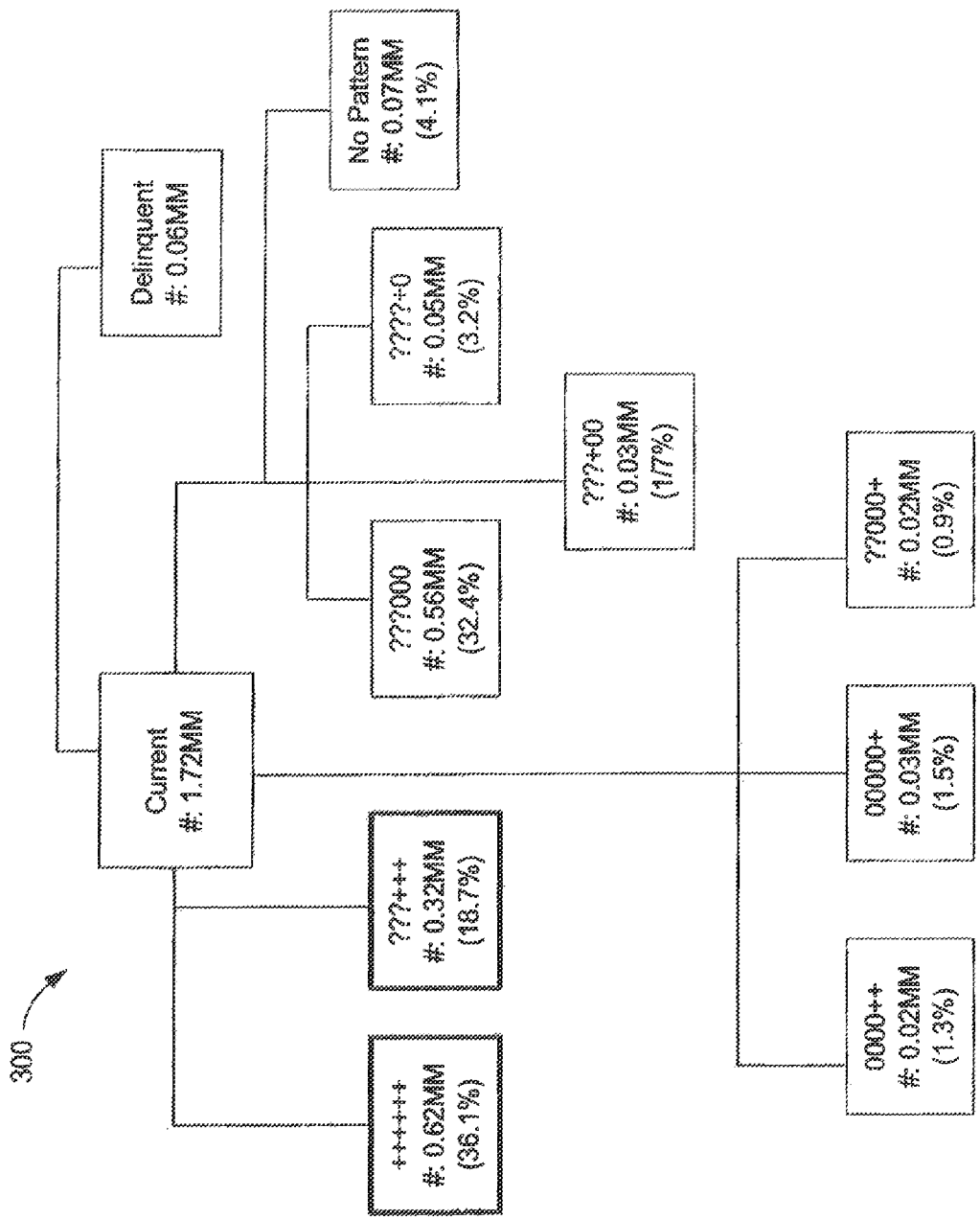
FIG. 3 is a diagram of exemplary categories of consumers examined during the process of FIG. 2.

As shown in the diagram 300 of FIG. 3, a population of consumers for which individual and/or aggregated data has been provided may be divided first into two general categories for analysis, for example, those that are current on their credit accounts (representing 1.72 million consumers in the exemplary data sample size of 1.78 million consumers) and those that are delinquent (representing 0.06 million of such consumers). In one embodiment, delinquent consumers may be discarded from the populations being modeled.

In further embodiments, the population of current consumers is then subdivided into a plurality of further categories based on the amount of balance information available and the balance activity of such available data. In the example shown in the diagram 300, the amount of balance information available is represented by string of '+' '0' and '?' characters. Each character represents one month of available data, with the rightmost character representing the most current months and the leftmost character representing the earliest month for which data is available. In the example provided in FIG. 3, a string of six characters is provided, representing the six most recent months of data for each category. The '+' character represents a month in which a credit account balance of the consumer has increased. The "0" character may represent months where the account balance is zero. The "?" character represents months for which balance data is unavailable. Also provided the diagram is number of consumers fallen to each category and the percentage of the consumer population they represent in that sample.

In further embodiments, only certain categories of consumers may be selected for modeling behavior. The selection may be based on those categories that demonstrate increased spend on their credit balances over time. However, it should be readily appreciated that other categories can be used. FIG. 3 shows the example of two categories of selected consumers for modeling in bold. These groups show the availability of at least the three most recent months of balance data and that the balances increased in each of those months.

Figure 4:
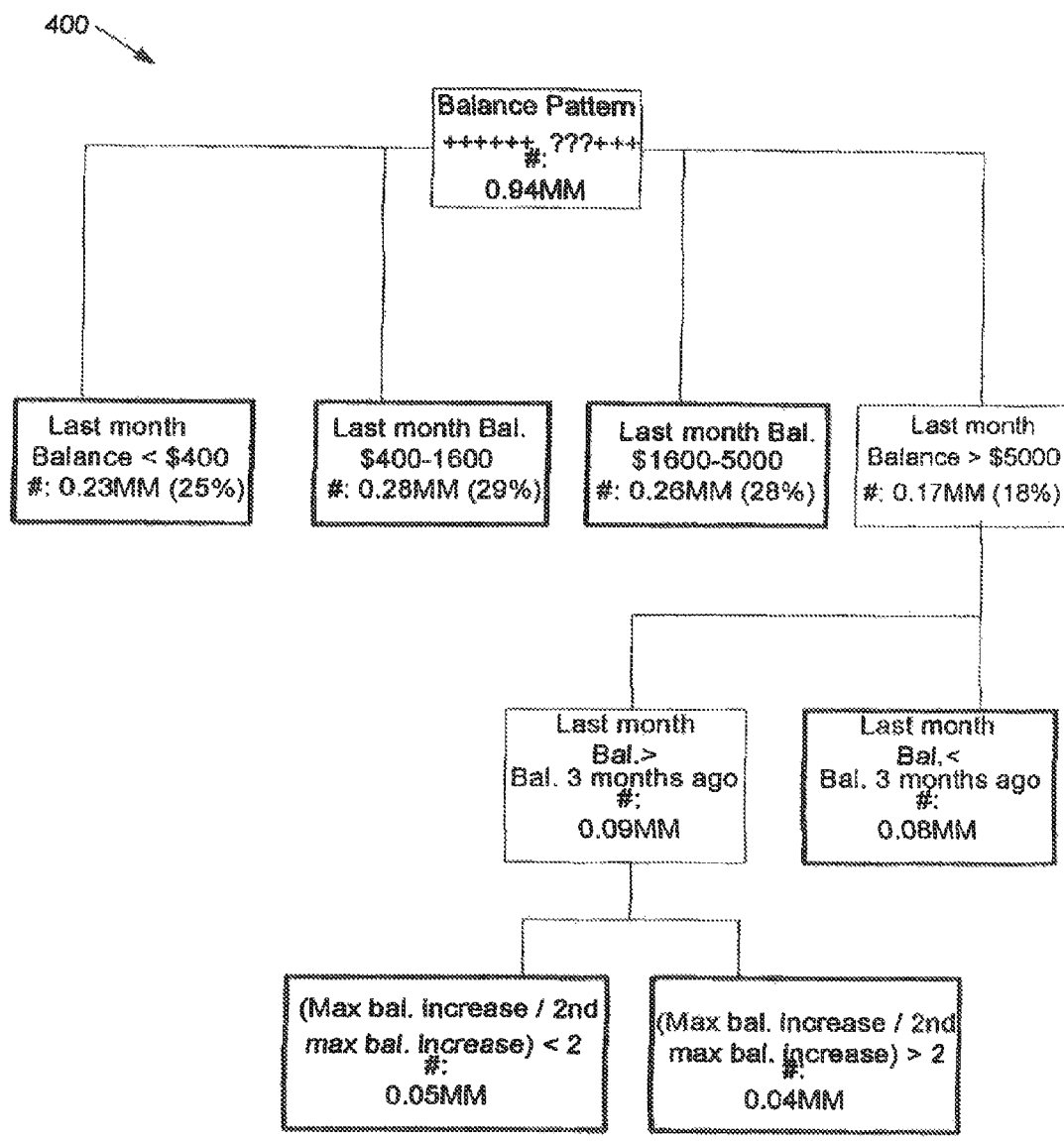
FIG. 4 is a diagram of exemplary subcategories of consumers modeled during the process of FIG. 2.

Turning now to FIG. 4, therein is depicted an exemplary diagram 400 showing sub-categorization of the two categories of FIG. 3 in bold that are selected for modeling. In the embodiment shown, the sub-categories may include: consumers having a most recent credit balance less than $400; consumers having a most recent credit balance between $400 and $1600; consumers having a most recent credit balance between $1600 and $5000; consumers whose most recent credit balance is less than the balance of, for example, three months ago; consumers whose maximum credit balance increase over, for example, the last twelve months divided by the second highest maximum balance increase over the same period is less than 2; and consumers whose maximum credit balance increase over the last twelve months divided by the second highest maximum balance increase is greater than 2. It should be readily appreciated that other subcategories can be used. Each of these sub-categories is defined by their last month balance level. The number of consumers from the sample population (in millions) and the percentage of the population for each category are also shown in FIG. 4.

There may be a certain balance threshold established, wherein if a consumer's account balance is too high, their behavior may not be modeled, since such consumers are less likely to have sufficient spending ability. Alternatively, or in addition thereto, consumers having balances above such threshold may be sub-categorized yet again, rather than completely discarded from the sample. In the example shown in FIG. 4, the threshold value may be $5000, and only those having particular historical balance activity may be selected, i.e. those consumers whose present balance is less than their balance three months earlier, or whose maximum balance increase in the examined period meets certain parameters. Other threshold values may also be used and may be dependent on the individual and aggregated consumer data provided.

Figure 5:
FIG. 5 is a diagram of financial data used for model generation and validation according to the process of FIG. 2.

As described in the foregoing, the models generated in the process 200 may be derived, validated and refined using tradeline and consumer panel data. An example of tradeline data 500 from Experian and consumer panel data 502 from comScore are represented in FIG. 5. Each row of the data 500, 502 represents the record of one consumer and thousands of such records may be provided at a time. The statement 500 shows the point-in-time balance of consumers accounts for three successive months (Balance 1, Balance 2 and Balance 3). The data 502 shows each consumer's purchase volume, last payment amount, previous balance amount and current balance. Such information may be obtained, for example, by page scraping the data (in any of a variety of known manners using appropriate application programming interfaces) from an Internet web site or network address at which the data 502 is displayed. Furthermore, the data 500 and 502 may be matched by consumer identity and combined by one of the data providers or another third party independent of the financial institution. Validation of the models using the combined data 500 and 502 may then be performed, and such validation may be independent of consumer identity.

Figure 6:
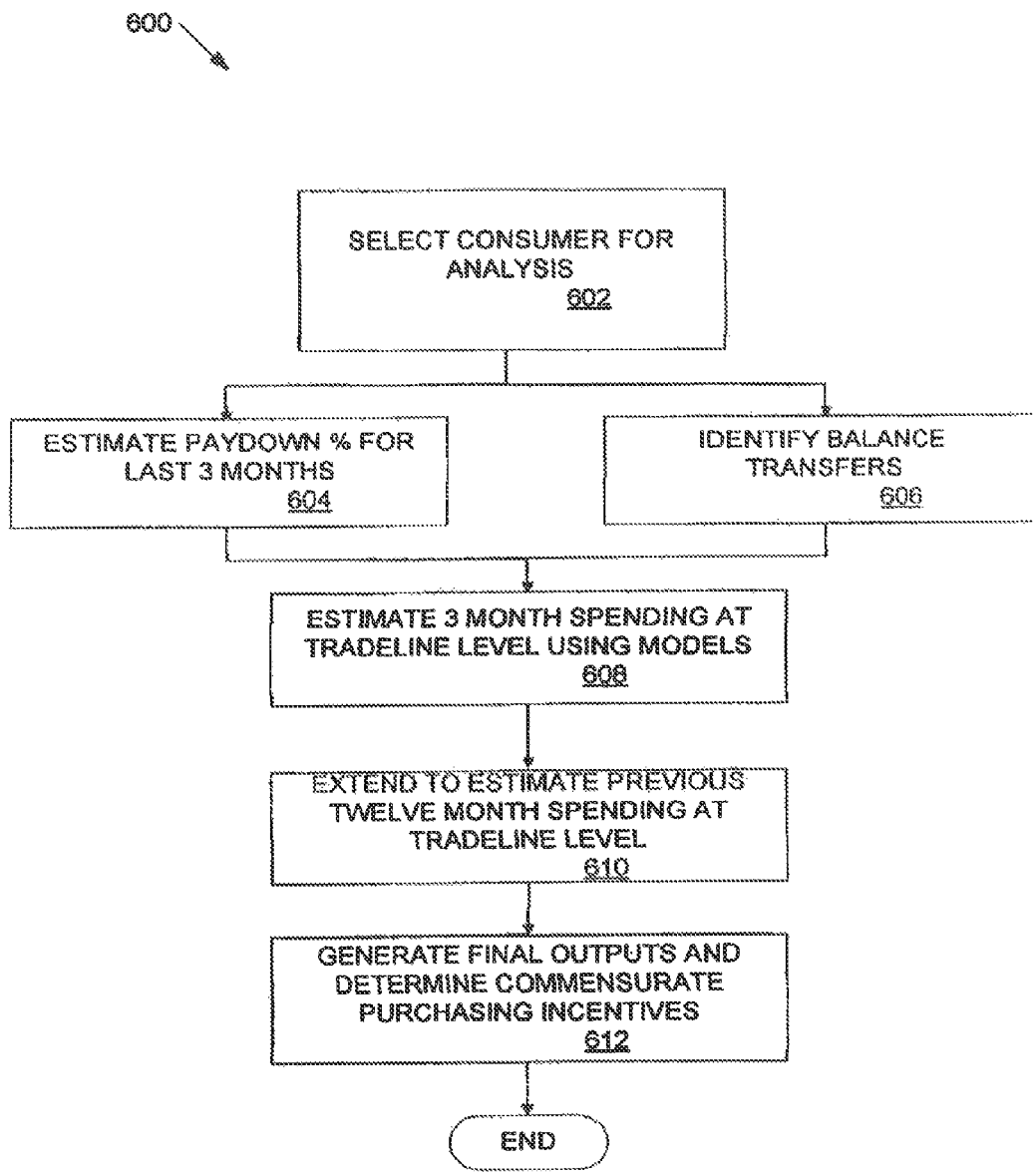
FIG. 6 is a flowchart of an exemplary process for estimating the spend ability of a consumer, performed by the financial server of FIG. 1.

Turning now to FIG. 6, therein is depicted an exemplary process 600 for estimating the size of an individual consumer's spending wallet. Upon completion of the modeling of the consumer categories above, the process 600 commences with the selection of individual consumers or prospects to be examined (step 602). An appropriate model derived during the process 200 will then be applied to the presently available consumer tradeline information in the following manner to determine, based on the results of application of the derived models, an estimate of a consumer's size of wallet. Each consumer of interest may be selected based on their falling into one of the categories selected for modeling described above, or may be selected using any of a variety of criteria.

The process 600 continues to step 604 where, for a selected consumer, a paydown percentage over a previous period of time is estimated for each of the consumer's credit accounts. In one embodiment, the paydown percentage is estimated over the previous three-month period of time based on available tradeline data, and may be calculated according to the following formula:

Pay-down %=(The sum of the last three months payments from the account)/(The sum of three month balances for the account based on tradeline data).

The paydown percentage may be set to, for example, 2%, for any consumer exhibiting less than a 5% paydown percentage, and may be set to 100% if greater than 80%, as a simplified manner for estimating consumer spending behaviors on either end of the paydown percentage scale.

Consumers that exhibit less than a 50% paydown during this period may be categorized as revolvers, while consumers that exhibit a 50% paydown or greater may be categorized as transactors. These categorizations may be used to initially determine what, if any, purchasing incentives may be available to the consumer, as described later below.

The process 600, then continues to step 606, where balance transfers for a previous period of time are identified from the available tradeline data for the consumer. The identification of balance transfers are essential since, although tradeline data may reflect a higher balance on a credit account over time, such higher balance may simply be the result of a transfer of a balance into the account, and are thus not indicative of a true increase in the consumer's spending. It is difficult to confirm balance transfers based on tradeline data since the information available is not provided on a transaction level basis. In addition, there are typically lags or absences of reporting of such values on tradeline reports.

Nonetheless, marketplace analysis using confirmed consumer panel and internal customer financial records has revealed reliable ways in which balance transfers into an account may be identified from imperfect individual tradeline data alone. Three exemplary reliable methods for identifying balance transfers from credit accounts, each which is based in part on actual consumer data sampled, are as follows. It should be readily apparent that these formulas in this form are not necessary for all embodiments of the present process and may vary based on the consumer data used to derive them.

A first rule identifies a balance transfer for a given consumer's credit account as follows. The month having the largest balance increase in the tradeline data, and which satisfies the following conditions, may be identified as a month in which a balance transfer has occurred:

The maximum balance increase is greater than twenty times the second maximum balance increase for the remaining months of available data;

The estimated pay-down percent calculated at step 306 above is less than 40%; and The largest balance increase is greater than $1000 based on the available data.

A second rule identifies a balance transfer for a given consumer's credit account in any month where the balance is above twelve times the previous month's balance and the next month's balance differs by no more than 20%.

A third rule identifies a balance transfer for a given consumer's credit account in any month where:

the current balance is greater than 1.5 times the previous month's balance;

the current balance minus the previous month's balance is greater than $4500; and the estimated pay-down percent from step 306 above is less than 30%.

The process 600 then continues to step 608, where consumer spending on each credit account is estimated over the next, for example, three month period. In estimating consumer spend, any spending for a month in which a balance transfer has been identified from individual tradeline data above is set to zero for purposes of estimating the size of the consumer's spending wallet, reflecting the supposition that no real spending has occurred on that account. The estimated spend for each of the three previous months may then be calculated as follows:

> Estimated spend=(the current balance−the previous month's balance+(the previous month's balance*the estimated pay-down % from step 604 above).

The exact form of the formula selected may be based on the category in which the consumer is identified from the model applied, and the formula is then computed iteratively for each of the three months of the first period of consumer spend.

Next, at step 610 of the process 600, the estimated spend is then extended over, for example, the previous three quarterly or three-month periods, providing a most-recent year of estimated spend for the consumer.

Finally, at step 612, this in turn may be used to generate a plurality of final outputs for each consumer account (step 314). These may be provided in an output file that may include a portion or all of the following exemplary information, based on the calculations above and information available from individual tradeline data:

(i) size of previous twelve month spending wallet; (ii) size of spending wallet for each of the last four quarters; (iii) total number of revolving cards, revolving balance, and average pay down percentage for each; (iv) total number of transacting cards, and transacting balances for each; (v) the number of balance transfers and total estimated amount thereof; (vi) maximum revolving balance amounts and associated credit limits; and (vii) maximum transacting balance and associated credit limit.

After step 612, the process 600 ends with respect to the examined consumer. It should be readily appreciated that the process 600 may be repeated for any number of current customers or consumer prospects.

Figure 7:
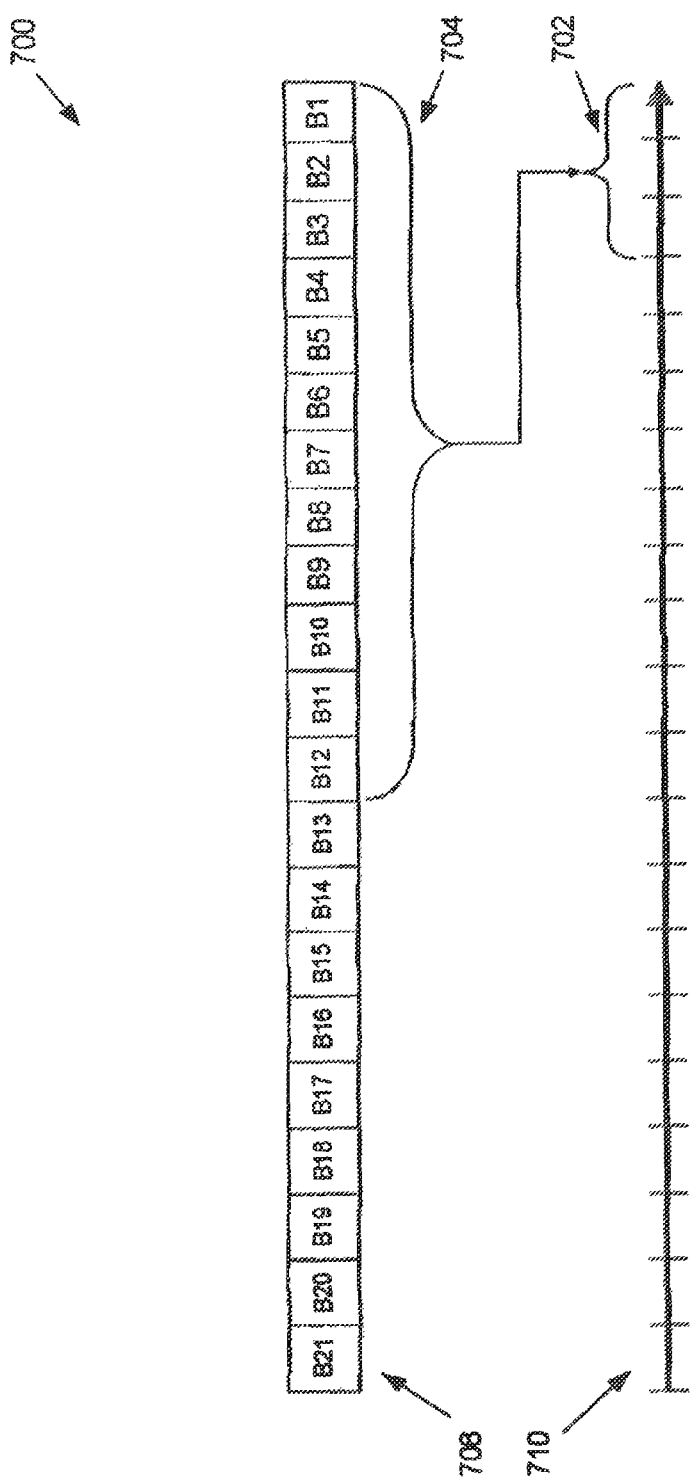
FIG. 7-10 are exemplary timelines showing the rolling time periods for which individual customer data is examined during the process of FIG. 6.

Referring now to FIGS. 7-10, therein is depicted illustrative diagrams 700-1000 of how such estimated spending is calculated in a rolling manner across each previous three month (quarterly) period. In FIG. 7, there is depicted a first three month period (i.e., the most recent previous quarter) 702 on a timeline 710. As well, there is depicted a first twelve-month period 704 on a timeline 708 representing the last twenty-one months of point-in-time account balance information available from individual tradeline data for the consumer's account. Each month's balance for the account is designated as "B#." B1-B12 represent actual account balance information available over the past twelve months for the consumer. B13-B21 represent consumer balances over consecutive, preceding months.

In accordance with the diagram 700, spending in each of the three months of the first quarter 702 is calculated based on the balance values B1-B12, the category of the consumer based on consumer spending models generated in the process 200, and the formulas used in steps 604 and 606.

Figure 8:
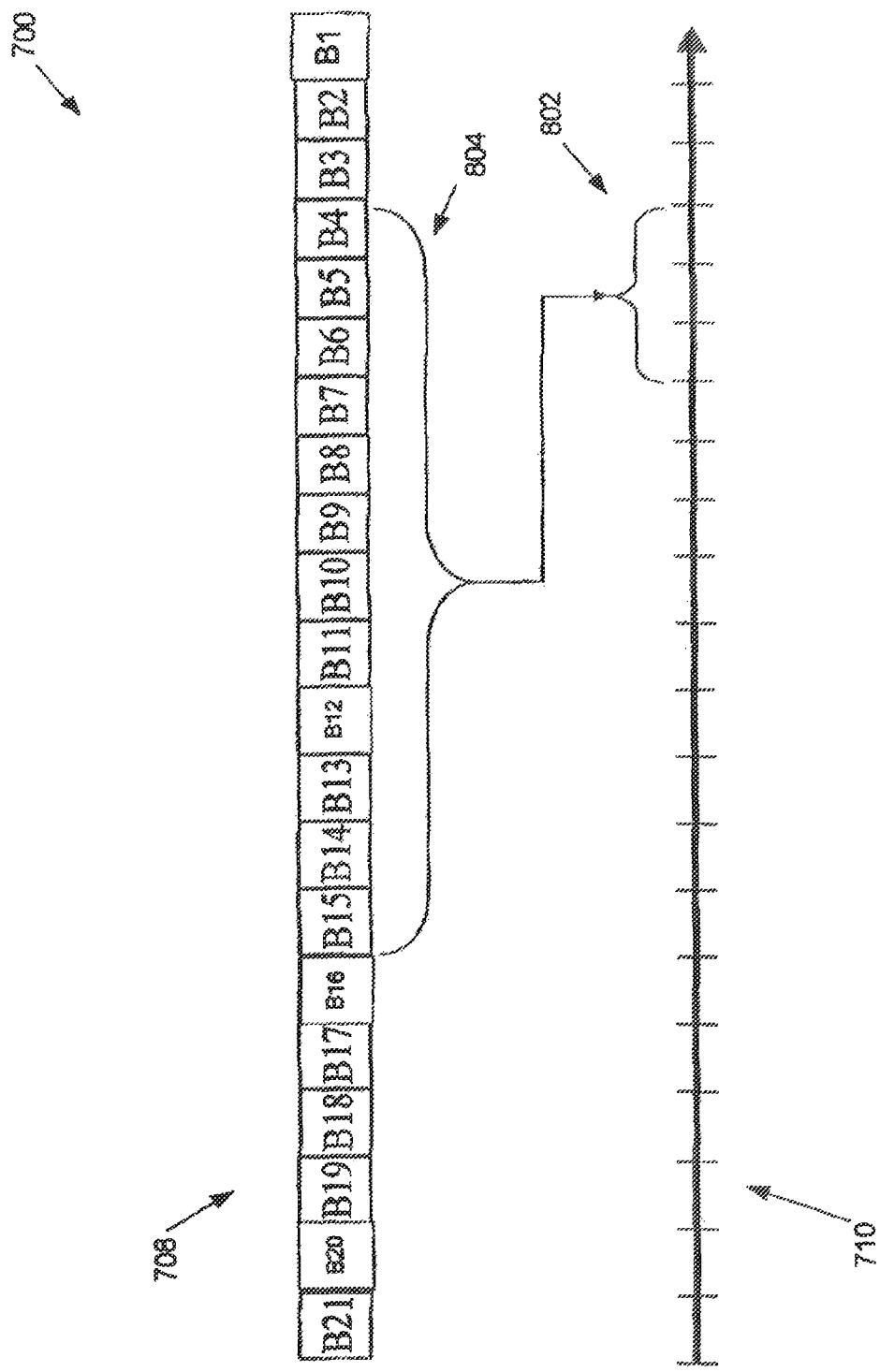

Turning now to FIG. 8, there is shown a diagram 800 illustrating the balance information used for estimating spending in a second previous quarter 802 using a second twelve-month period of balance information 804. Spending in each of these three months of the second previous quarter 802 is based on known balance information B4-B15.

Figure 9:
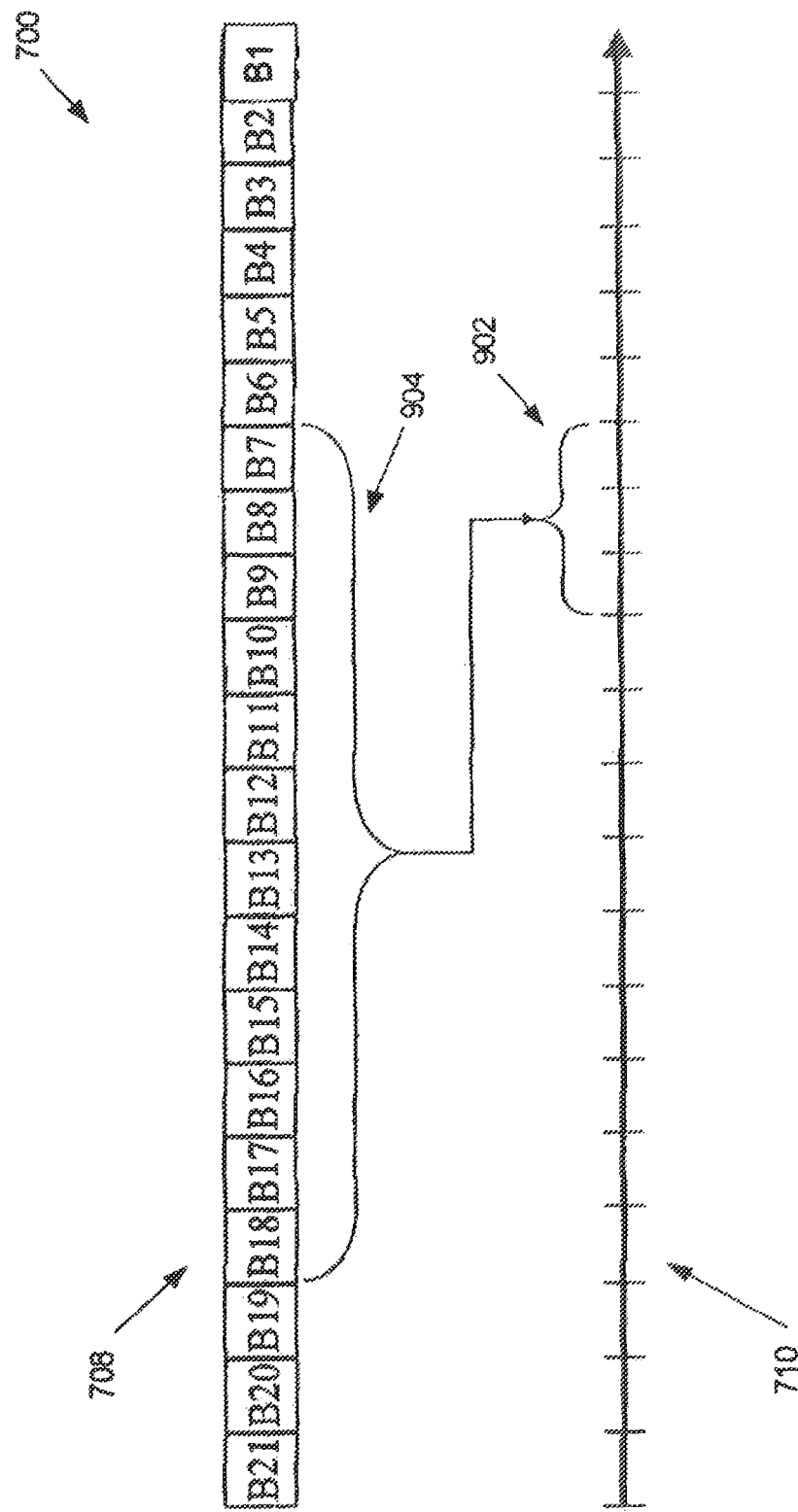

Turning now to FIG. 9, there is shown a diagram 900 illustrating the balance information used for estimating spending in a third successive quarter 902 using a third twelve-month period of balance information 904. Spending in each of these three months of the third previous quarter 902 is based on known balance information B7-B18.

Figure 10:
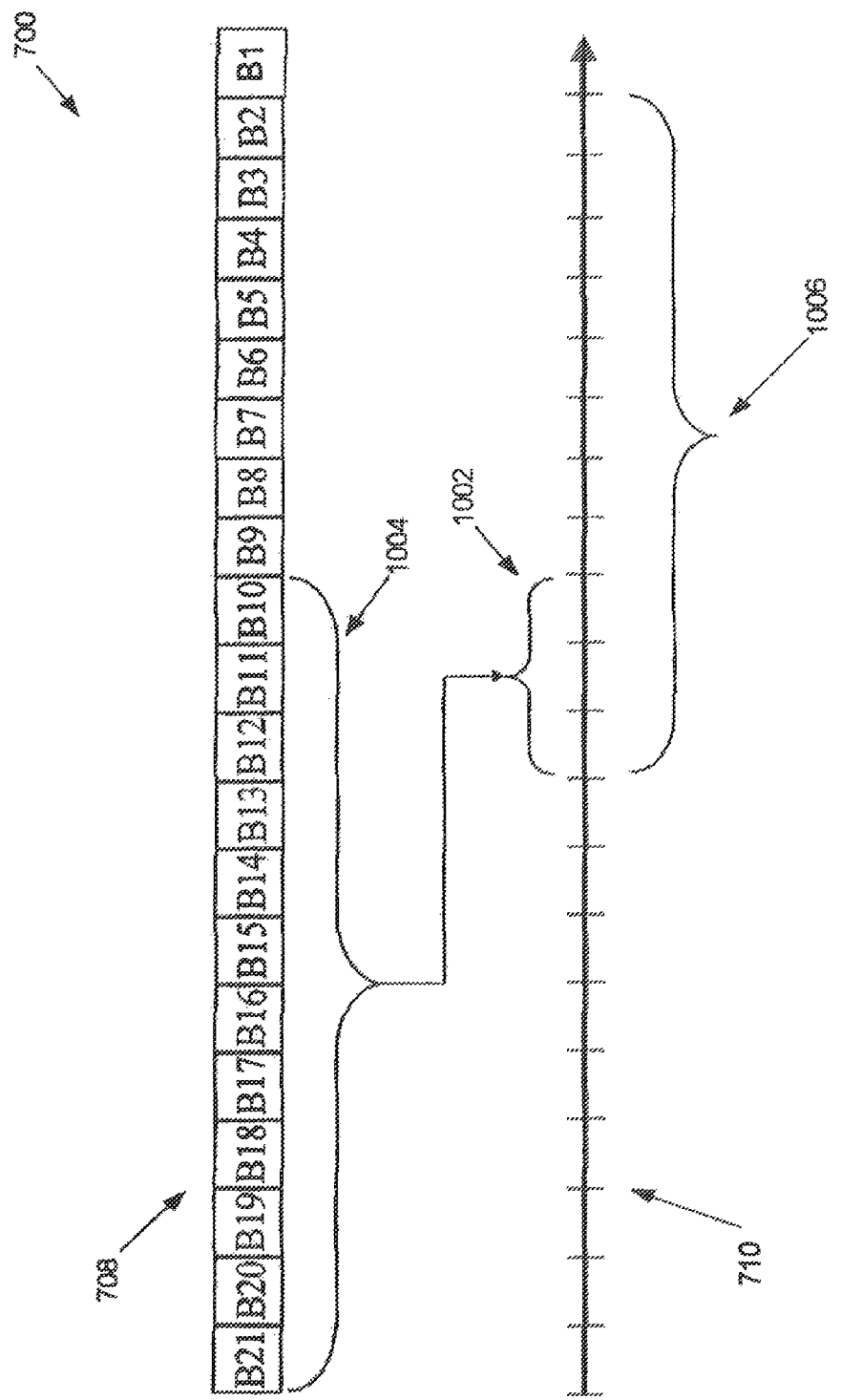

Turning now to FIG. 10, there is shown a diagram 1000 illustrating the balance information used for estimating spending in a fourth previous quarter 1002 using a fourth twelve-month period of balance information 1004. Spending in each of these three months of the fourth previous quarter 1002 is based on balance information B10-B21.

It should be readily appreciated that as the rolling calculations proceed, the consumer's category may change based on the outputs that result, and, therefore, different formula corresponding to the new category may be applied to the consumer for different periods of time. The rolling manner described above maximizes the known data used for estimating consumer spend in a previous twelve month period 1006.

Based on the final output generated for the customer, commensurate purchasing incentives may be identified and provided to the consumer, for example, in anticipation of an increase in the consumer's purchasing ability as projected by the output file. In such cases, consumers of good standing, who are categorized as transactors with a projected increase in purchasing ability, may be offered a lower financing rate on purchases made during the period of expected increase in their purchasing ability, or may be offered a discount or rebate for transactions with selected merchants during that time.

In another example, and in the case where a consumer is a revolver, such consumer with a projected increase in purchasing ability may be offered a lower annual percentage rate on balances maintained on their credit account.

Other like promotions and enhancements to consumers' experiences are well known and may be used within the processes disclosed herein.

Various statistics for the accuracy of the processes 200 and 600 are provided in FIGS. 11-18, for which a consumer sample was analyzed by the process 200 and validated using 24 months of historic actual spend data. The table 1100 of FIG. 11 shows the number of consumers having a balance of $5000 or more for whom the estimated paydown percentage (calculated in step 604 above) matched the actual paydown percentage (as determined from internal transaction data and external consumer panel data).

The table 1200 of FIG. 12 shows the number of consumers having a balance of $5000 or more who were expected to be transactors or revolvers, and who actually turned out to be transactors and revolvers based on actual spend data. As can be seen, the number of expected revolvers who turned out to be actual revolvers (80539) was many times greater than the number of expected revolvers who turned out to be transactors (1090). Likewise, the number of expected and actual transactors outnumbered by nearly four-to-one the number of expected transactors that turned out to be revolvers.

The table 1300 of FIG. 13 shows the number of estimated versus actual instances in the consumer sample of when there occurred a balance transfer into an account. For instance, in the period sampled, there were 148,326 instances where no balance transfers were identified in step 606 above, and for which a comparison of actual consumer data showed there were in fact no balance transfers in. This compares to only 9,534 instances where no balance transfers were identified in step 606, but there were in fact actual balance transfers.

The table 1400 of FIG. 14 shows the accuracy of estimated spending (in steps 608-612) versus actual spending for consumers with account balances (at the time this sample testing was performed) greater than $5000. As can be seen, the estimated spending at each spending level most closely matched the same actual spending level than for any other spending level in nearly all instances.

The table 1500 of FIG. 15 shows the accuracy of estimated spending (in steps 608-612) versus actual spending for consumers having most recent account balances between $1600 and $5000. As can be readily seen, the estimated spending at each spending level most closely matched the same actual spending level than for any other spending level in all instances.

The table 1600 of FIG. 16 shows the accuracy of estimated spending versus actual spending for all consumers in the sample. As can be readily seen, the estimated spending at each spending level most closely matched the same actual spending level than for any other actual spending level in all instances.

The table 1700 of FIG. 17 shows the rank order of estimated versus actual spending for all consumers in the sample. This table 1700 readily shows that the number of consumers expected to be in the bottom 10% of spending most closely matched the actual number of consumers in that category, by 827,716 to 22,721. The table 1700 further shows that the number of consumers expected to be in the top 10% of spenders most closely matched the number of consumers who were actually in the top 10%, by 71,773 to 22,721.

The table 1800 of FIG. 18 shows estimated versus actual annual spending for all consumers in the sample over the most recent year of available data. As can be readily seen, the expected number of consumers at each spending level most closely matched the same actual spending level than any other level in all instances.

Finally, the table 1900 of FIG. 19 shows the rank order of estimated versus actual total annual spending for all the consumers over the most recent year of available data. Again, the number of expected consumers in each rank most closely matched the actual rank than any other rank.

Prospective customer populations used for modeling and/or later evaluation may be provided from any of a plurality of available marketing groups, or may be culled from credit bureau data, targeted advertising campaigns or the like. Testing and analysis may be continuously performed to identify the optimal placement and required frequency of such sources for using the size of spending wallet calculations. The processes described herein may also be used to develop models for predicting a size of wallet for an individual consumer in the future.

Institutions adopting the processes disclosed herein may expect to more readily and profitably identify opportunities for prospect and customer offerings, which in turn provides enhanced experiences across all parts of a customer's lifecycle. In the case of a credit provider, accurate identification of spend opportunities allows for rapid provisioning of card member offerings to increase spend that, in turn, results in increased transaction fees, interest charges and the like. The careful selection of customers to receive such offerings reduces the incidence of fraud that may occur in less disciplined card member incentive programs. This, in turn, reduces overall operating expenses for institutions.

II. MODEL OUTPUT FOR INDIVIDUAL CONSUMERS

As mentioned above, the process described may also be used to develop models for predicting a size of wallet for an individual consumer in the future. The capacity a consumer has for spending in a variety of categories is the share of wallet. The model used to determine share of wallet for particular spend categories using the processes described herein is the share of wallet ("SoW") model. The SoW model provides estimated data and/or characteristics information that is more indicative of consumer spending power than typical credit bureau data or scores. The SoW model may output, with sufficient accuracy, data that is directly related to the spend capacity of an individual consumer. One of skill in the art will recognize that any one or combination of the following data types, as well as other data types, may be output by the SoW model without altering the spirit and scope of the present invention.

The size of a consumer's twelve-month spending wallet is an example output of the SoW model. This type of data is typically output as an actual or rounded dollar amount. The size of a consumer's spending wallet for each of several consecutive quarters, for example, the most recent four quarters, may also be output.

The SoW model output may include the total number of revolving cards held by a consumer, the consumer's revolving balance, and/or the consumer's average pay-down percentage of the revolving cards. The maximum revolving balance and associated credit limits can be determined for the consumer, as well as the size of the consumer's revolving spending.

Similarly, the SoW model output may include the total number of a consumer's transacting cards and/or the consumer's transacting balance. The SoW model may additionally output the maximum transacting balance, the associated credit limit, and/or the size of transactional spending of the consumer.

These outputs, as well as any other outputs from the SoW model, may be appended to data profiles of a company's customers and prospects. This enhances the company's ability to make decisions involving prospecting, new applicant evaluation, and customer relationship management across the customer lifecycle.

Additionally or alternatively, the output of the model can be calculated to equal a SoW score, much like credit bureau data is used to calculate a credit rating. Credit bureau scores are developed from data available in a consumer's file, such as the amount of lines of credit, payment performance, balance, and number of tradelines. This data is used to model the risk of a consumer over a period of time using statistical regression analysis. Those data elements that are found to be indicative of risk are weighted and combined to determine the credit score. For example, each data element may be given a score, with the final credit score being the sum of the data element scores.

A SoW score, based on the SoW model, may provide a higher level of predictability regarding spend capacity and creditworthiness. The SoW score can focus, for example, on total spend, plastic spend and/or a consumer's spending trend. Using the processes described above, balance transfers are factored out of a consumer's spend capacity. Further, when correlated with a risk score, the SoW score may provide more insight into behavior characteristics of relatively low-risk consumers and relatively high-risk consumers.

The SoW score may be structured in one of several ways. For instance, the score may be a numeric score that reflects a consumer's spend in various ranges over a given time period, such as the last quarter or year. As an example, a score of 5000 might indicate that a consumer spent between $5000 and $6000 in the given time period.

Alternatively or additionally, the score may include a range of numbers or a numeric indicator, such as an exponent, that indicates the trend of a consumer's spend over a given time period. For example, a trend score of +4 may indicate that a consumer's spend has increased over the previous 4 months, while a trend score of −4 may indicate that a consumer's spend has decreased over the previous 4 months.

In addition to determining an overall SoW score, the SoW model outputs may each be given individual scores and used as attributes for consideration in credit score development by, for example, traditional credit bureaus. As discussed above, credit scores are traditionally based on information in a customer's credit bureau file. Outputs of the SoW model, such as balance transfer information, spend capacity and trend, and revolving balance information, could be more indicative of risk than, some traditional data elements. Therefore, a company may use scored SoW outputs in addition to or in place of traditional data elements when computing a final credit score. This information may be collected, analyzed, and/or summarized in a scorecard. This would be useful to, for example and without limitation, credit bureaus, major credit grantors, and scoring companies, such as Fair Isaac Corporation of Minneapolis, Minn.

The SoW model outputs for individual consumers or small businesses can also be used to develop various consumer models to assist in direct marketing campaigns, especially targeted direct marketing campaigns. For example, "best customer" or "preferred customer" models may be developed that correlate characteristics from the SoW model outputs, such as plastic spend, with certain consumer groups. If positive correlations are identified, marketing and customer relationship management strategies may be developed to achieve more effective results.

In an example embodiment, a company may identify a group of customers as its "best customers." The company can process information about those customers according to the SoW model. This may identify certain consumer characteristics that are common to members of the best customer group. The company can then profile prospective customers using the SoW model, and selectively target those who have characteristics in common with the company's best consumer model.

Figure 20:
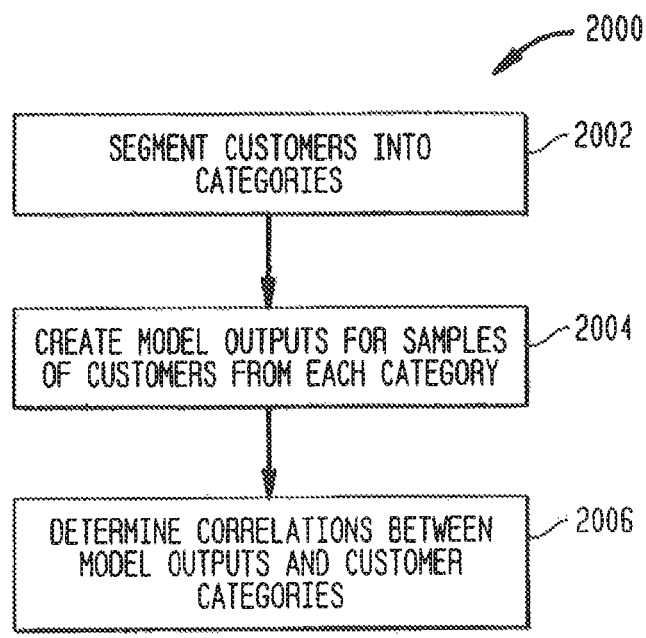
FIG. 20 is a flowchart of a method for determining common characteristics across a particular category of customers according to an embodiment of the present invention.

FIG. 20 is a flowchart of a method 2000 for using model outputs to improve customer profiling. In step 2002, customers are segmented into various categories. Such categories may include, for example and without limitation, best customers, profitable customers, marginal customers, and other customers.

In step 2004, model outputs are created for samples of customers from each category. The customers used in step 2004 are those for whom detailed information is known.

In step 2006, it is determined whether there is any correlation between particular model outputs and the customer categories.

Alternatively, the SoW model can be used to separate existing customers on the basis of spend capacity. This allows separation into groups based on spend capacity. A company can then continue with method 2000 for identifying correlations, or the company may look to non-credit-related characteristics of the consumers in a category for correlations.

If a correlation is found, the correlated model output(s) is deemed to be characteristic and/or predictive of the related category of customers. This output can then be considered when a company looks for customers who fit its best customer model.

III. MODELING AND OUTPUTS FOR COMMERCIAL CONSUMERS

Commercial size of spending wallet ("SoSW") may also be predicted. Commercial SoSW is the total business-related spending of a company including cash but excluding bartered items. In order to determine commercial SoSW, data is needed from sources other than consumer credit bureaus. This is because, according to market studies, approximately 7% of small business spending occurs on plastic. Thus, only a small portion of total business spend would be captured by consumer credit bureaus. Company financial statements, however, provide a comprehensive summary of business spend.

Figure 21:
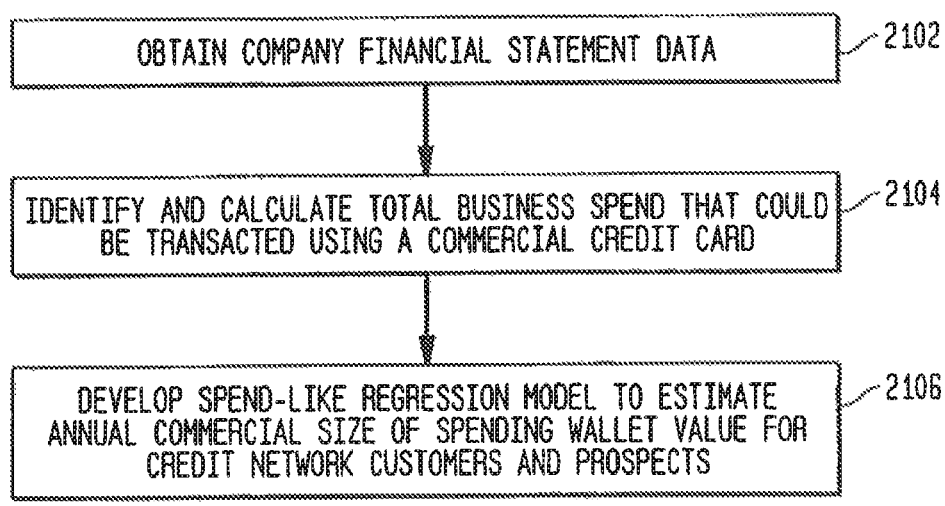
FIG. 21 is a flowchart of a method for estimating commercial size of spending wallet ("SoSW") according to an embodiment of the present invention.

Company financial statement data may be used in a top-down method to estimate commercial SoSW. FIG. 21 is a flowchart of an example method for estimating commercial SoSW. In step 2102, company financial statement data is obtained. The company of interest may be a customer and/or prospect in a credit network. An example credit network is OPEN: The Small Business Network ("OSBN") from American Express. Although credit network companies will be referred to herein as OSBN companies, one of skill in the pertinent art will recognize that any credit network may be used without departing from the spirit and scope of the present invention. The company financial statement data may be obtained from, for example, the High Balance Reunderwriting Unit ("HBRU") database of commercially underwritten OSBN businesses. The HBRU database includes data on high-spending OSBN customers that are underwritten at least annually. The database also includes business financial statements, which are a standard requirement of the underwriting process. Usually covering 12 months, these financial statements provide detailed expense information that can be used to assess potential plastic, or credit card, spend. Also included in the database are over approximately 33,000 underwriting events for approximately 16,000 unique OSBN businesses.

Detailed operating expenses ("OpEx") costs from the HBRU database are available in hard copy only, making it difficult to electronically differentiate different types of spend, such as cardable (spend that could be put on plastic) and uncardable (spend that could not be put on plastic). An example source for electronic company financial statement data is the tax statistics section of the Internal Revenue Service ("IRS") website. This section of the IRS website includes business summary statistics based on a stratified, weighted sample of approximately 500,000 unaudited company tax returns and financial statements. Available fields in the IRS website include OpEx details, which allow for electronic distinction between cardable and uncardable spend. These summaries are available at the industry and/or legal structure level. The industry grouping is based on the North American Industry Classification System ("NAICS"), which replaced the U.S. Standard Industrial Classification ("SIC") system.

Additional sources of company financial statement data include, for example and without limitation, trade credit data from the Equifax Small Business Enterprise ("SBE") database, produced by Equifax Inc. of Atlanta, Ga.; the Experian Business Information Solutions ("BIS") database produced by Experian of Costa Mesa, Calif.; and the Dun & Bradstreet database, produced by Dun & Bradstreet Corp. of Short Hills, N.J. Trade credit data is credit provided by suppliers to merchants at the supplier offices. Trade credit has been associated with various repayment options, including, for example, a 2% discount if paid back to the supplier in 10 days, with the net amount due within 30 days. Such a repayment term is usually referred to as 2/10 net 30.

In step 2104, total business spend that could be transacted using a commercial credit card is identified and calculated. FIG. 22 is a sample financial statement that may be analyzed using the commercial SoSW model. The SoSW model for a particular business considers at least two components: cost of goods sold ("CoGS") and operating expenses ("OpEx"). For purposes of this application, it is assumed that 100% of CoGS spend can be converted to plastic. Each OpEx component is classified as "cardable" or "uncardable". These components may be distinguished in the statement, as is shown in the example of FIG. 22. Only the cardable OpEx is included in the commercial SoSW calculation. The total SoSW for a particular business can be calculated by adding the CoGS and the cardable OpEx:

$$SoSW = CoGS + Cardable\ OpEx$$

Thus, according to the sample financial statement in FIG. 22, the CoGS equals $5,970,082, the total OpEx equals $285,467, and the cardable OpEx equals $79,346 (28% of total OpEx). The total SoSW for this business thus equals $6,049,428. Once the total SoSW has been calculated, method 2100 proceeds to step 2106.

In step 2106, a spend-like regression model is used to estimate annual commercial SoSW value for OSBN customers and prospects. The industry-based summaries from the IRS website, for example, may be used to calculate a cardable OpEx percentage for each combination of industry and legal structure. This will be referred to herein as the cardable OpEx ratio. Based on the industry and legal structure of credit network customers in, for example, the HBRU database, the relevant cardable OpEx ratio is applied.

Industry-level commercial SoSW is calculated using the given cost of goods sold, total operating expenses, and the cardable OpEx ratio as derived from, for example, the IRS data:

$$SoSW = CoGS + (Total\ OpEx * Cardable\ OpEx\ Ratio)$$

Figure 23:
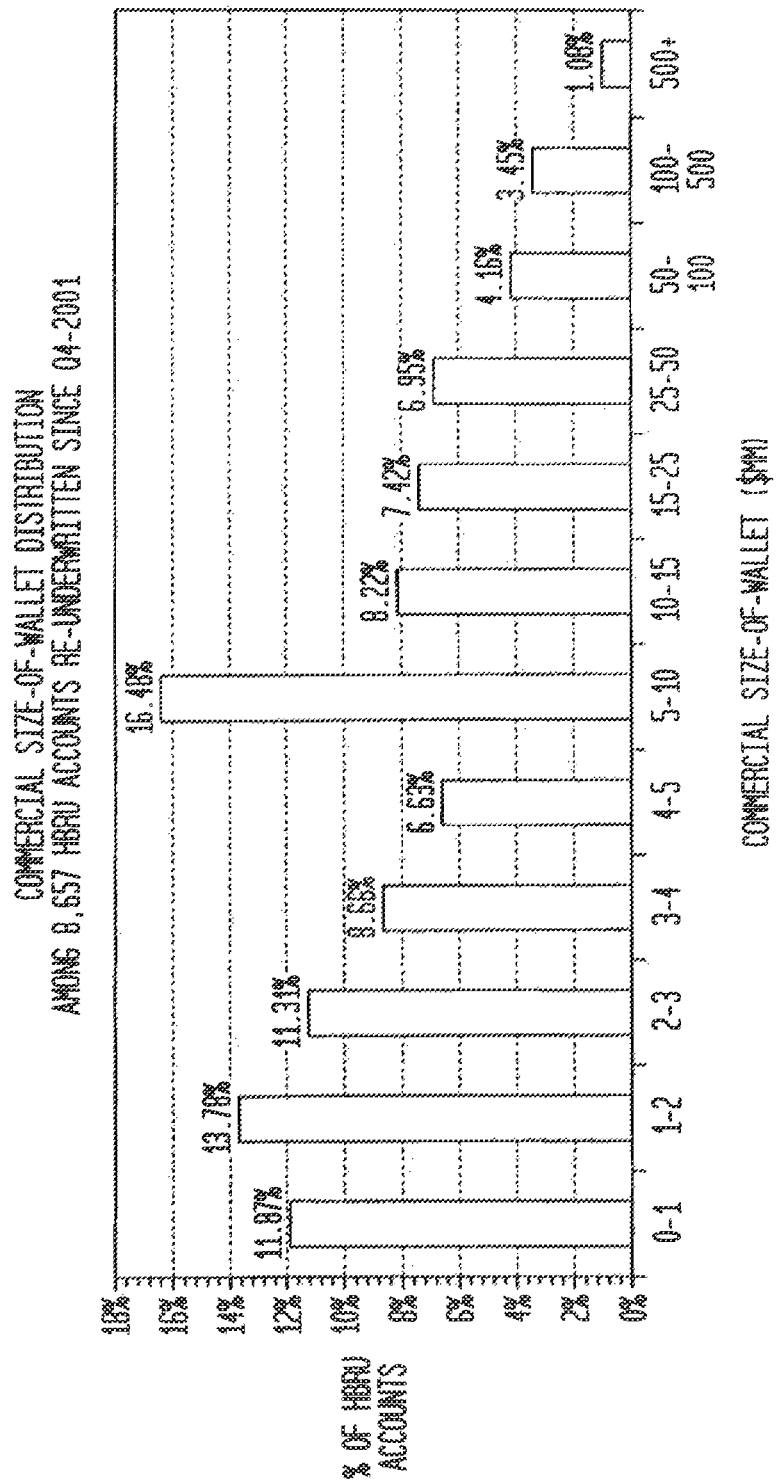
FIG. 23 is a chart displaying the distribution of commercial SoSW among OSBN HBRU businesses.

These elasticities within the industries can then be analyzed to derive business-level estimations of SoSW. FIG. 23 displays the distribution of commercial SoSW estimates among the OSBN HBRU businesses. This analysis is based on OSBN underwriting events over approximately 2.5 years, resulting in 16,337 underwriting events across 8,657 unique OSBN businesses.

Figure 24:
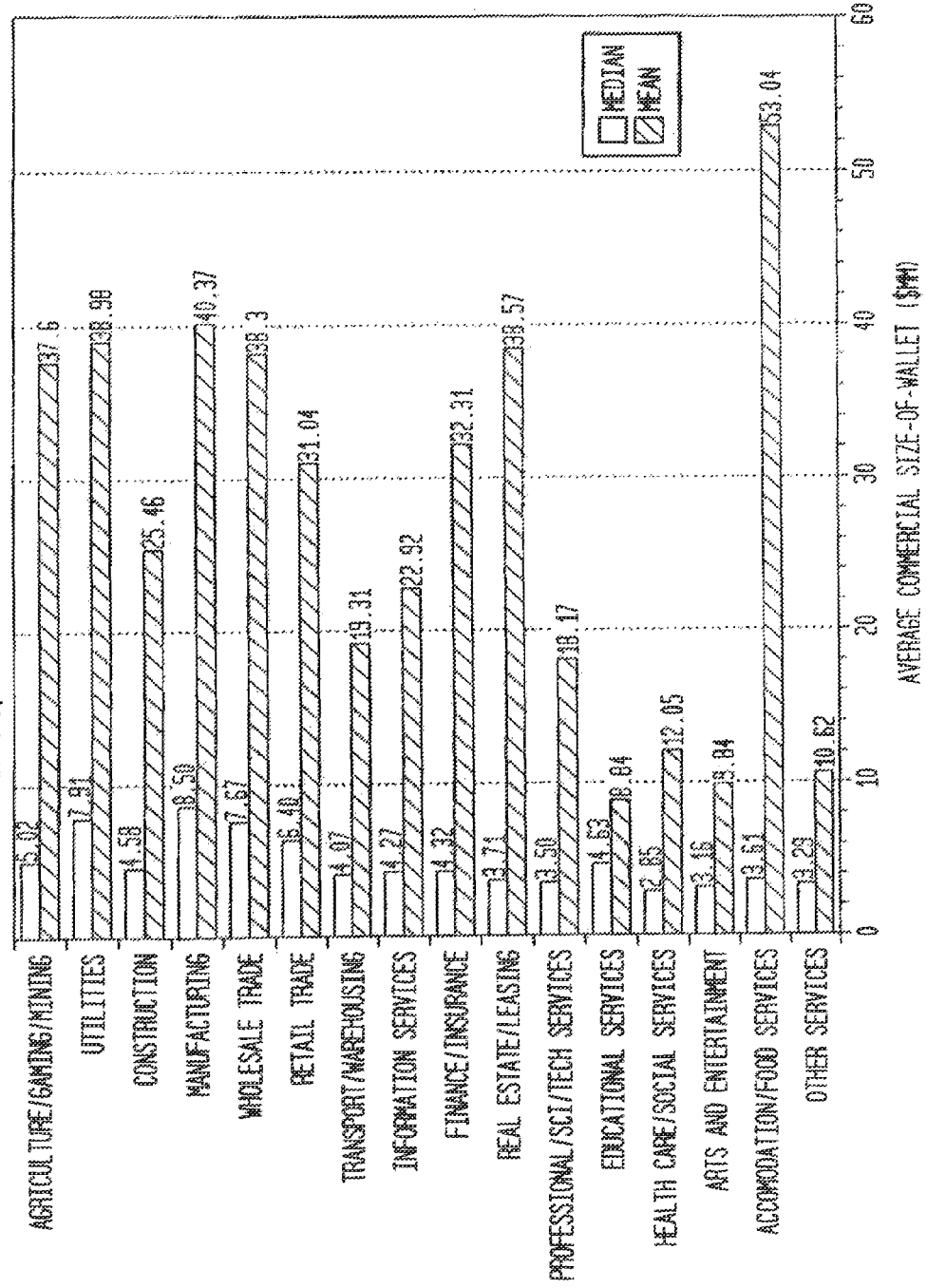
FIG. 24 is a chart displaying the median and mean commercial SoSW by industry.

Commercial SoSW differs significantly by industry. As shown in FIG. 24, most industries include a small percentage of high-potential businesses that drive a large discrepancy between the mean and median SoSW values.

Figure 25:
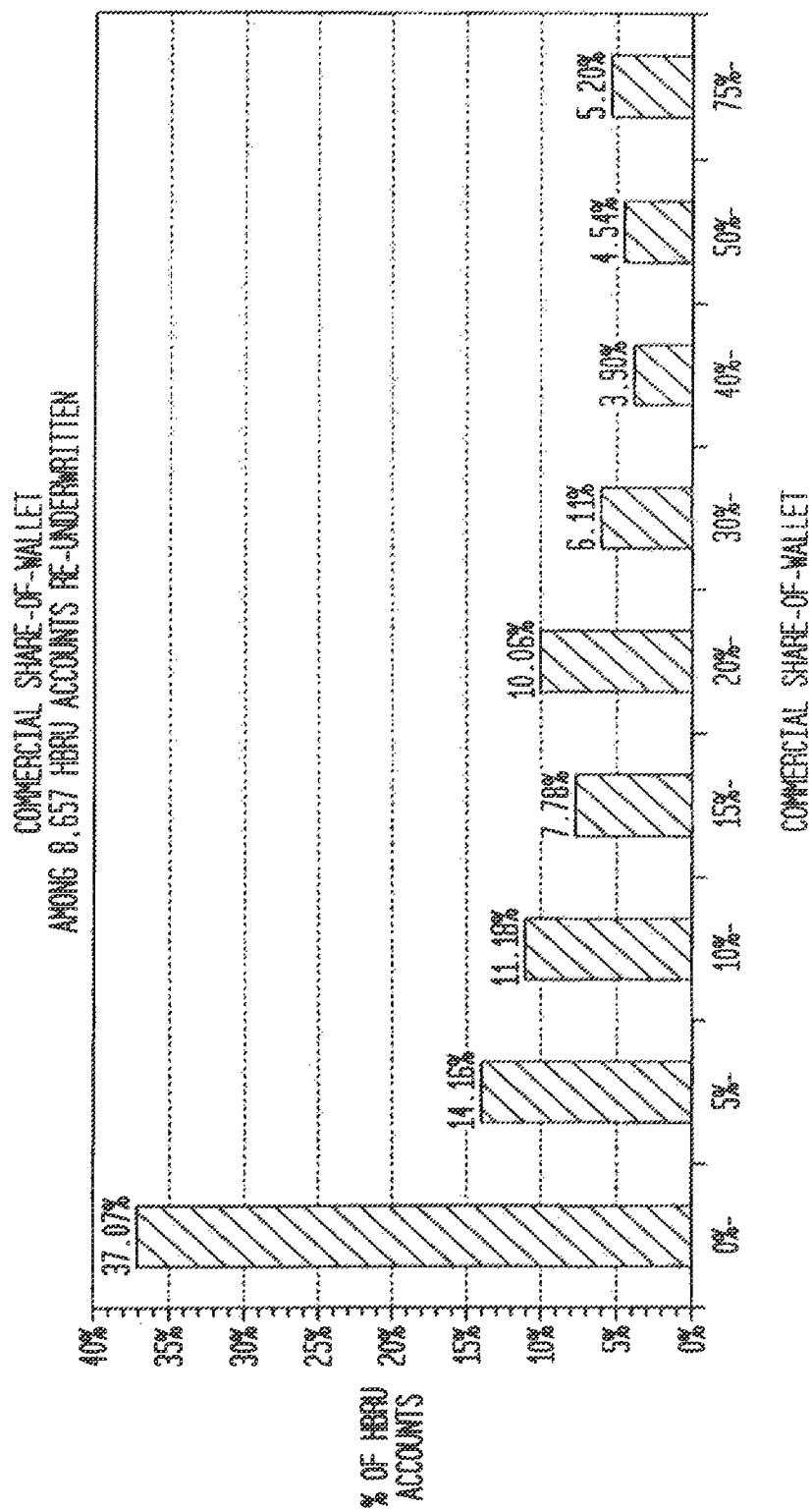
FIG. 25 is a chart displaying a sample share of wallet distribution among HBRU accounts.

Commercial SoSW represents overall annual cardable expenditures. As discussed above, share of wallet ("SoW") represents the portion of the total spending wallet that is allocated towards, for example, a particular financial institution. Commercial share of wallet (SoW) can be measured by dividing annual OSBN spend (from the global risk management system ("GRMS")) into commercial SoSW. As shown in FIG. 25, over 51% of HBRU businesses have a commercial SoW of less than 10%. This illustrates the magnitude of the opportunity to capture additional spend.

FIG. 26 is a table that describes the relationship between the commercial SoSW model and business variables. This information is based on Dun & Bradstreet data, and the adjusted $R^2$ value for the data analyzed is 0.3456. The commercial SoSW model takes into consideration, for example and without limitation, annual sales amount of the company, number of employees in the company, highest credit amount of the company within the previous 13 months, total dollar amount of satisfactory financial experiences by the company over the previous 13 months, and a financial stress score percentile of the company, wherein a percentile of 0 indicates highest risk, and a percentile of 100 indicates lowest risk. Annual sales amount, number of employees, and highest credit amount within the last 13 months all have a positive linear effect on a company's commercial SoSW. The total dollar amount of satisfactory financial experiences over the last 13 months has a positive logarithmic effect on a company's commercial SoSW. The financial stress score percentile has a negative linear effect on a company's commercial SoSW.

The commercial SoSW model was validated based on actual data from high-balance re-underwritten OSBN accounts. FIG. 27 is a graph comparing actual commercial SoSW results to the predicted commercial SoSW estimates. As shown in FIG. 27, this model performs well as a rank-ordering tool.

FIG. 28 is a Lorenz-curve graph comparing the commercial SoSW model to a perfectly random prediction. As shown in FIG. 28, the top 10% of businesses, in terms of predicted commercial SoSW, account for nearly 60% of the actual commercial SoSW.

In the data discussed above, the financial statements used were only for high-balance customers, resulting in sample selection bias. Nonetheless, the model assessment shows that this application is effective on businesses with annual revenue of $1 million or greater, based on Dun & Bradstreet data. This is a high-revenue segment, and approximately 12% to 15% of the OSBN base meets this high-revenue status. Although the examples incorporated herein refer to this high-revenue segment, one of skill in the pertinent art will recognize that a commercial SoSW metric may also be developed for middle-market corporate consumers without departing from the spirit and scope of the present invention, as will be discussed below.

Predicted commercial SoSW values are quintiled into the following ranges:
Q1: <$3.85 MM
Q2: $3.85 MM to $5.18 MM
Q3: $5.18 MM to $6.62 MM
Q4: $6.62 MM to $9.38 MM
Q5: >$9.38 MM Although five classifications having the above values are referred to herein, one of skill in the pertinent art will recognize that fewer or more classifications may be used, and the classifications may use a different range of values, without departing from the spirit and scope of the present invention.

Figure 29:
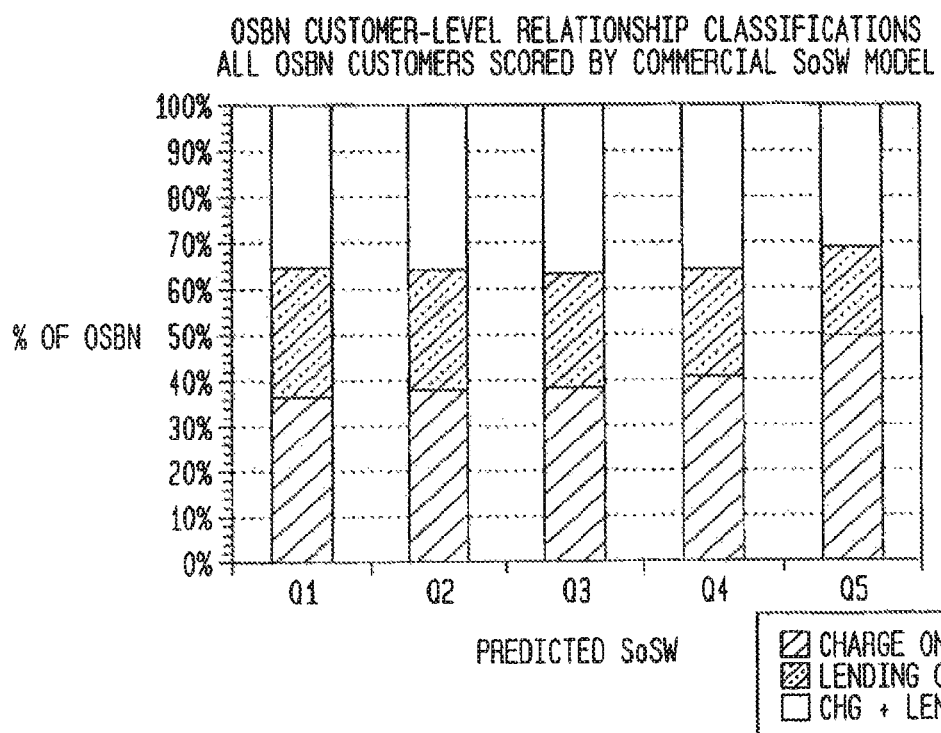
FIG. 29 is a chart illustrating customer-level relationship classifications according to an embodiment of the present invention.
Figure 30:
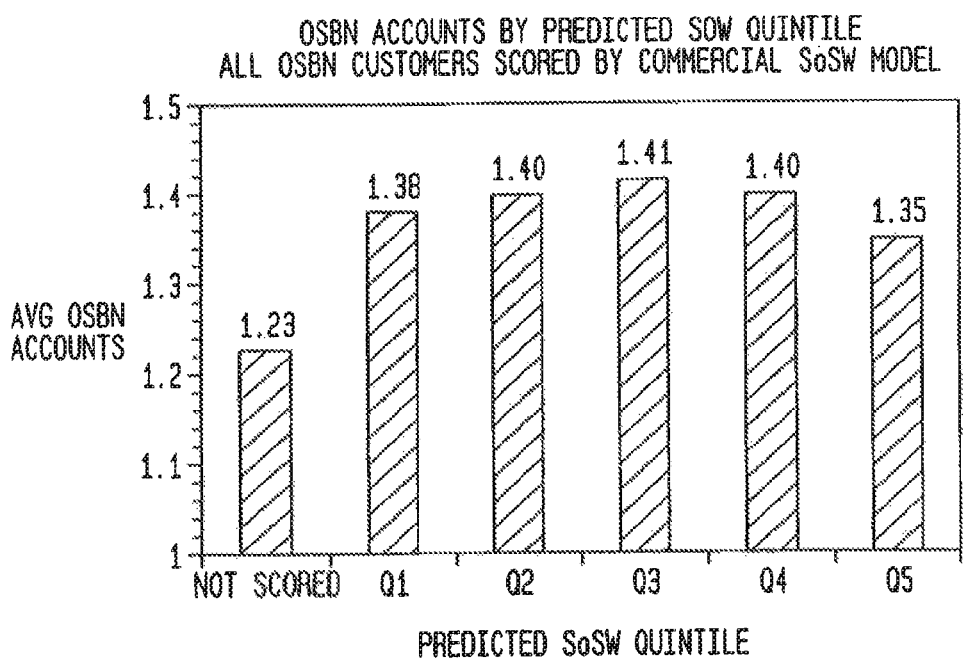
FIG. 30 is a chart illustrating the active number of OSBN accounts by quintile according to an embodiment of the present invention.

FIG. 29 is a chart illustrating the customer-level relationship classifications, or quintiles. Each quintile is separated into percentages of customers who only charge, only lend, and both charge and lend. As shown, the proportion of OSBN charge customers increases with the predicted commercial SoSW quintile. However, as shown in FIG. 30, which illustrates the active number of OSBN accounts by quintile, the proportion of charge customers does not necessarily increase for average active number of OSBN accounts by quintile.

The commercial SoSW model may output a scored output file. FIG. 31 is a table that displays customer counts in the scored output file. Customers in the higher SoSW and lower OSBN Spend cells represent the greatest potential for converting plastic spend outside of a financial company to spend related to the financial company, as well as for converting non-plastic business spend to spend related to the financial company. Higher SoSW and higher OSBN Spend cells signify opportunities for growing OSBN spend among higher-spending customers.

As discussed above, commercial SoW for an OSBN company can be determined based on annual OSBN spend and commercial SoSW. Various targets and predictors may be used to determine commercial SoW for different commercial segments including and other than the OSBN segment. For example, for OSBN companies having a revenue above $1 million as reported, for example, by Dun & Bradstreet, the commercial SoW model targets company financial statements using Dun & Bradstreet's Credit Scoring Attribute Database ("CSAD") as a predictor. A method of segmentation based on data availability and ordinary least squares ("OLS") models can be used to output a company-level SoW value, which can be used, for example, to analyze prospects, new accounts, and customer management.

For OSBN companies with an Equifax SBE trade level balance history, the commercial SoW model may target SBE time series balance amounts using Equifax SBE as a predictor. A methodology similar to the consumer SoW model can be used to output a company-level SoW value, which can be used, for example, to analyze new accounts and customer management.

For core OSBN companies, a "bottoms up" approach may be used. Trade level detail on commercial bureaus and other external data sources may be targeted using the Dun & Bradstreet CSAD, Dun & Bradstreet Detailed Trade, Experian BIS, and Equifax SBE databases as predictors. A method of segmentation based on data availability and OLS models can be used to output a company-level SoW value, which can be used, for example, to analyze prospects, new accounts, and customer management.

For core OSBN companies, an industry inference approach may also be used. Industry-level financial statement data is targeted using the Dun & Bradstreet CSAD, Dun & Bradstreet Detailed Trade, Experian BIS, and Equifax SBE databases as predictors. A method of segmentation based on data availability and OLS models can be used to output an industry-level SoW or a company-level SoW value, which can be used, for example, to analyze prospects, new accounts, and customer management.

For low revenue middle market companies, or for medium and larger revenue middle market companies, company financial statements may be targeted using the Dun & Bradstreet CSAD as a predictor. The existing OSBN model is combined with new middle market data to output an industry-level SoW or a company-level SoW value, which can be used, for example, to analyze prospects, new accounts, and customer management.

For other middle market companies, a "bottoms up" approach may be used. Trade level detail on commercial bureaus and other external data sources is targeted using the Dun & Bradstreet CSAD as a predictor. A method of segmentation based on data availability and OLS models can be used to output an industry-level SoW or a company-level SoW value, which can be used, for example, to analyze prospects, new accounts, and customer management.

For Global Establishment Services ("GES") companies that overlap to the middle market or OSBN, the middle market or OSBN value can be targeted using the middle market or OSBN data plus any unique GES data as predictors. A method of segmentation based on data availability and OLS models can be used to output a company-level SoW value, which can be used, for example, to analyze prospects, new accounts, and customer management.

For GES companies that do not overlap with the middle market or OSBN, charge volume plus Dun & Bradstreet data and other external data may be targeted using the GES and Dun & Bradstreet as predictors. A method of segmentation based on data availability and OLS models can be used to output a company-level SoW value, which can be used, for example, to analyze prospects, new accounts, and customer management. It can also be used to output total business volume at a company-specific level and total business volume at an industry-specific level.

Other data elements can be generated as well, such as a transactor vs. revolver indicator, largest transactor balance data, largest revolver balance data, and trade types and number of trade types data. Thus, commercial SoW, including plasticable SoW (spend that can be converted to plastic) and plastic SoW (spend that is already on plastic) can be predicted for a wide range of companies and industries.

IV. APPLICABLE MARKET SEGMENTS/INDUSTRIES FOR SoW

Outputs of the SoW model can be used in any business or market segment that extends credit or otherwise needs to evaluate the creditworthiness or spend capacity of a particular customer. These businesses will be referred to herein as falling into one of three categories: financial services companies, retail companies, and other companies. Although the applicable market segments and industries will be referred to herein with reference to consumers and individual consumer SoW, one of skill in the art will recognize that companies and commercial SoW may be used in a similar manner without departing from the spirit and scope of the present invention.

The business cycle in each category may be divided into three phases: acquisition, retention, and disposal. The acquisition phase occurs when a business is attempting to gain new customers. This includes, for example and without limitation, targeted marketing, determining what products or services to offer a customer, deciding whether to lend to a particular customer and what the line size or loan should be, and deciding whether to buy a particular loan. The retention phase occurs after a customer is already associated with the business. In the retention phase, the business interests shift to managing the customer relationship through, for example, consideration of risk, determination of credit lines, cross-sell opportunities, increasing business from that customer, and increasing the company's assets under management. The disposal phase is entered when a business wishes to dissociate itself from a customer or otherwise end the customer relationship. This can occur, for example, through settlement offers, collections, and sale of defaulted or near-default loans.

A. Financial Services Companies

Financial services companies include, for example and without limitation: banks and lenders, mutual fund companies, financiers of leases and sales, life insurance companies, online brokerages, and loan buyers.

Banks and lenders can utilize the SoW model in all phases of the business cycle. One exemplary use is in relation to home equity loans and the rating given to a particular bond issue in the capital market. Although not specifically discussed herein, the SoW model would apply to home equity lines of credit and automobile loans in a similar manner.

If the holder of a home equity loan, for example, borrows from the capital market, the loan holder issues asset-backed securities ("ABS"), or bonds, which are backed by receivables. The loan holder is thus an ABS issuer. The ABS issuer applies for an ABS rating, which is assigned based on the credit quality of the underlying receivables. One of skill in the art will recognize that the ABS issuer may apply for the ABS rating through a any application means without altering the spirit and scope of the present invention. In assigning a rating, the rating agencies weigh a loan's probability of default by considering the lender's underwriting and portfolio management processes. Lenders generally secure higher ratings by credit enhancement. Examples of credit enhancement include over-collateralization, buying insurance (such as wrap insurance), and structuring ABS (through, for example, senior/subordinate bond structures, sequential pay vs. pari passu, etc.) to achieve higher ratings. Lenders and rating agencies take the probability of default into consideration when determining the appropriate level of credit enhancement.

During the acquisition phase of a loan, lenders may use the SoW model to improve their lending decisions. Before issuing the loan, lenders can evaluate a consumer's spend capacity for making payments on the loan. This leads to fewer bad loans and a reduced probability of default for loans in the lender's portfolio. A lower probability of default means that, for a given loan portfolio that has been originated using the SoW model, either a higher rating can be obtained with the same degree of over-collateralization, or the degree of over-collateralization can be reduced for a given debt rating. Thus, using the SoW model at the acquisition stage of the loan reduces the lender's overall borrowing cost and loan loss reserves.

During the retention phase of a loan, the SoW model can be used to track a customer's spend. Based on the SoW outputs, the lender can make various decisions regarding the customer relationship. For example, a lender may use the SoW model to identify borrowers who are in financial difficulty. The credit lines of those borrowers which have not fully been drawn down can then be reduced. Selectively revoking unused lines of credit may reduce the probability of default for loans in a given portfolio and reduce the lender's borrowing costs. Selectively revoking unused lines of credit may also reduce the lender's risk by minimizing further exposure to a borrower that may already be in financial distress.

During the disposal phase of a loan, the SoW model enables lenders to better predict the likelihood that a borrower will default. Once the lender has identified customers who are in danger of default, the lender may select those likely to repay and extend settlement offers. Additionally, lenders can use the SoW model to identify which customers are unlikely to pay and those who are otherwise not worth extending a settlement offer.

The SoW model allows lenders to identify loans with risk of default, allowing lenders, prior to default, to begin anticipating a course of action to take if default occurs. Because freshly defaulted loans fetch a higher sale price than loans that have been non-performing for longer time periods, lenders may sell these loans earlier in the default period, thereby reducing the lender's costs.

The ability to predict and manage risk before default results in a lower likelihood of default for loans in the lender's portfolio. Further, even in the event of a defaulted loan, the lender can detect the default early and thereby recoup a higher percentage of the value of that loan. A lender using the SoW model can thus show to the rating agencies that it uses a combination of tight underwriting criteria and robust post-lending portfolio management processes. This enables the lender to increase the ratings of the ABS that are backed by a given pool or portfolio of loans and/or reduce the level of over-collateralization or credit enhancement required in order to obtain a particular rating.

Turning to mutual funds, the SoW model may be used to manage the relationship with customers who interact directly with the company. During the retention phase, if the mutual fund company concludes that a customer's spending capacity has increased, the company can conclude that either or both of the customer's discretionary and disposable income has increased. The company can then market additional funds to the customer. The company can also cross-sell other services that the customer's increased spend capacity would support.

Financiers of leases or sales, such as automobile lease or sale financiers, can benefit from SoW outputs in much the same way as a bank or lender, as discussed above. In typical product financing, however, the amount of the loan or lease is based on the value of the product being financed. Therefore, there is generally no credit limit that needs to be revisited during the course of the loan. For this reason, the SoW model is most useful to lease/sales finance companies during the acquisition and disposal phases of the business cycle.

Life insurance companies can primarily benefit from the SoW model during the acquisition and retention phases of the business cycle. During the acquisition phase, the SoW model allows insurance companies to identify those people with adequate spend capacity for paying premiums. This allows the insurance company to selectively target its marketing efforts to those most likely to purchase life insurance. For example, the insurance company could model consumer behavior in a similar manner as the "best customer" model described above. During the retention phase, an insurance company can use the SoW model to determine which of its existing clients have increased their spend capacity and would have a greater capability to purchase additional life insurance. In this way, those existing customers could be targeted at a time during which they would most likely be willing to purchase without overloading them with materials when they are not likely to purchase.

The SoW model is most relevant to brokerage and wealth management companies during the retention phase of the business cycle. Due to convenience factors, consumers typically trade through primarily one brokerage house. The more incentives extended to a customer by a company, the more likely the customer will use that company for the majority of its trades. A brokerage house may thus use the SoW model to determine the capacity or trend of a particular customer's spend and then use that data to cross-sell other products and/or as the basis for an incentive program. For example, based on the SoW outputs, a particular customer may become eligible for additional services offered by the brokerage house, such as financial planning, wealth management, and estate planning services.

Just as the SoW model can help loan holders determine that a particular loan is nearing default, loan buyers can use the model to evaluate the quality of a prospective purchase during the acquisition phase of the business cycle. This assists the loan buyers in avoiding or reducing the sale prices of loans that are in likelihood of default.

B. Retail Companies

Aspects of the retail industry for which the SoW model would be advantageous include, for example and without limitation: retail stores having private label cards, on-line retailers, and mail order companies.

There are two general types of credit and charge cards in the marketplace today: multipurpose cards and private label cards. A third type of hybrid card is emerging. Multipurpose cards are cards that can be used at multiple different merchants and service providers. For example, American Express, Visa, Mastercard, and Discover are considered multipurpose card issuers. Multipurpose cards are accepted by merchants and other service providers in what is often referred to as an "open network." This essentially means that transactions are routed from a point-of-sale ("POS") through a network for authorization, transaction posting, and settlement. A variety of intermediaries play different roles in the process. These include merchant processors, the brand networks, and issuer processors. This open network is often referred to as an interchange network. Multipurpose cards include a range of different card types, such as charge cards, revolving cards, and debit cards, which are linked to a consumer's demand deposit account ("DDA") or checking account.

Private label cards are cards that can be used for the purchase of goods and services from a single merchant or service provider. Historically, major department stores were the originators of this type of card. Private label cards are now offered by a wide range of retailers and other service providers. These cards are generally processed on a closed network, with transactions flowing between the merchant's POS and its own backoffice or the processing center for a third-party processor. These transactions do not flow through an interchange network and are not subject to interchange fees.

Recently, a type of hybrid card has evolved. This is a card that, when used at a particular merchant, is that merchant's private label card, but when used elsewhere, becomes a multipurpose card. The particular merchant's transactions are processed in the proprietary private label network. Transactions made with the card at all other merchants and service providers are processed through an interchange network.

Private label card issuers, in addition to multipurpose card issuers and hybrid card issuers, can apply the SoW model in a similar way as described above with respect to credit card companies. That is, knowledge of a consumer's spend capability, as well as knowledge of the other SoW outputs, could be used by card issuers to improve performance and profitability across the entire business cycle.

Online retail and mail order companies can use the SoW model in both the acquisition and retention phases of the business cycle. During the acquisition phase, for example, the companies can base targeted marketing strategies on SoW outputs. This could substantially reduce costs, especially in the mail order industry, where catalogs are typically sent to a wide variety of individuals. During the retention phase, companies can, for example, base cross-sell strategies or credit line extensions on SoW outputs.

The SoW model may also be useful to merchants accepting checks at a point of sale ("POS"). Before accepting a check from a consumer at a POS as a form of payment, merchants typically "verify" the check or request a "check guarantee". The verification and/or guarantee are usually provided by outside service providers.

Verification reduces the risk of the merchant's accepting a bad check. When a consumer attempts to pay by check, the merchant usually asks for a piece of identification. The merchant then forwards details of the check, such as the MICR number, and details of the identification (e.g., a driver's license number if the driver's license is proffered as identification) to a service provider. On a per transaction basis, the service provider searches one or more databases (e.g., National Check Network) containing negative and positive check writer accounts. The service provider uses these accounts to determine if there is a match between information in the database(s) and the specific piece of information provided by the merchant. A match may identify whether the check writer has a positive record or delinquent check-related debts.

Upon notification of this match, the merchant decides whether to accept or decline the check. The notification may be provided, for example, via a coded response from the provider. If the service provider is not a check guarantor, there is no guarantee that the check will be honored by the check writer's bank even when a search of the database(s) does not result in any negative results. The service providers earn a transaction fee each time the databases are searched.

Under a check guarantee arrangement, however, the service provider guarantees a check to the merchant. If the check is subsequently dishonored by the customer's bank, the merchant is reimbursed by the service provider, which then acquires rights to collect the delinquent amount from the check writer. The principal risk of providing this service is the risk of ever collecting the amount that the service provider guaranteed from a delinquent check writer whose check was dishonored by his bank. If the service provider is unable to collect the amount, it loses that amount.

Before guaranteeing a check, the service provider searches several databases using the customer data supplied by the merchant. The service provider then scores each transaction according to several factors. Factors which may be considered include, for example and without limitation, velocity, prior activity, check writer's presence in other databases, size of the check, and prior bad check activity by geographic and/or merchant specific locations. Velocity is the number of times a check writer has been searched in a certain period of time. Prior activity is based on the prior negative or positive transactions with the check writer. Check writer's presence in other databases looks at national databases that are selectively searched based on the size of the check and prior activity with the check writer. If the scoring system concludes that the risk is too high, the service provider refuses to guarantee the check. If the scoring system provides a positive result, the service provider agrees to guarantee the check.

Use of the SoW model thus benefits the service providers. At the origination phase, service providers may use SoW scores as one of the parameters for deciding whether or not to guarantee a check. For example, the SoW score can be used to differentiate between a low-risk consumer and a high-risk consumer. A low-risk consumer may be, for example, a person who is writing more checks because his income, as determined by the SoW model, has probably increased. In this case, the check velocity is not necessarily a measurement of higher risk. A high-risk consumer, on the other hand, may be a person whose check velocity has increased without a corresponding increase in income or spend capacity, as shown by the SoW model.

On average, some service providers collect on only 50% to 60% of the checks that they guarantee and that subsequently become delinquent. At the disposal phase of the business cycle, the service providers may use the SoW model in a similar manner to other financial institutions, as described above. For example, service providers may use SoW to determine, for example, which debts to collect in-house and which debts to sell. Thus, SoW helps service providers make the collection process more efficient.

C. Other Companies

Types of companies which also may make use of the SoW model include, for example and without limitation: the gaming industry, charities and universities, communications providers, hospitals, and the travel industry.

The gaming industry can use the SoW model in, for example, the acquisition and retention phases of the business cycle. Casinos often extend credit to their wealthiest and/or most active players, also known as "high rollers." The casinos can use the SoW model in the acquisition phase to determine whether credit should be extended to an individual. Once credit has been extended, the casinos can use the SoW model to periodically review the customer's spend capacity. If there is a change in the spend capacity, the casinos may alter the customer's credit line to be more commensurate with the customer's spend capacity.

Charities and universities rely heavily on donations and gifts. The SoW model allows charities and universities to use their often limited resources more effectively by timing their solicitations to coincide with periods when donors have had an increase in disposable/discretionary income and are thus better able to make donations. The SoW model also allows charities and universities to review existing donors to determine whether they should be targeted for additional support.

Communications providers, such as telephone service providers often contract into service plans with their customers.

In addition to improving their targeted marketing strategies, communications providers can use the SoW outputs during the acquisition phase to determine whether a potential customer is capable of paying for the service under the contract.

The SoW model is most applicable to hospitals during the disposal phase of the business cycle. Hospitals typically do not get to choose or manage the relationship with their patients. Therefore, they are often in the position of trying to collect for their services from patients with whom there was no prior customer relationship. There are two ways that a hospital can collect its fees. The hospital may run the collection in-house, or the hospital may turn over responsibility for the collection to a collection agent. Although the collection agent often takes fees for such a service, it can be to the hospital's benefit if the collection is time-consuming and/or difficult.

The SoW model can be used to predict which accounts are likely to pay with minimal persuasion, and which ones are not. The hospital can then select which accounts to collect in-house, and which accounts to outsource to collection agencies. For those that are retained in-house, the hospital can further segment the accounts into those that require simple reminders and those requiring more attention. This allows the hospital to optimize the use of its in-house collections staff. By selectively outsourcing collections, the hospital and other lenders reduces the contingency fees that it pays to collection agencies, and maximizes the amount collected by the in-house collection team.

Members of the travel industry can make use of the SoW data in the acquisition and retention stages of the business cycle. For example, a hotelier typically has a brand of hotel that is associated with a particular "star-level" or class of hotel. In order to capture various market segments, hoteliers may be associated with several hotel brands that are of different classes. During the acquisition phase of the business cycle, a hotelier may use the SoW method to target individuals that have appropriate spend capacities for various classes of hotels. During the retention phase, the hotelier may use the SoW method to determine, for example, when a particular individual's spend capacity increases. Based on that determination, the hotelier can market a higher class of hotel to the consumer in an attempt to convince the consumer to upgrade.

One of skill in the relevant art(s) will recognize that many of the above-described SoW applications may be utilized by other industries and market segments without departing from the spirit and scope of the present invention. For example, the strategy of using SoW to model an industry's "best customer" and targeting individuals sharing characteristics of that best customer can be applied to nearly all industries.

SoW data can also be used across nearly all industries to improve customer loyalty by reducing the number of payment reminders sent to responsible accounts. Responsible accounts are those who are most likely to pay even without being contacted by a collector. The reduction in reminders may increase customer loyalty, because the customer will not feel that the lender or service provider is unduly aggressive. The lender's or service provider's collection costs are also reduced, and resources are freed to dedicate to accounts requiring more persuasion.

Additionally, the SoW model may be used in any company having a large customer service call center to identify specific types of customers. Transcripts are typically made for any call from a customer to a call center. These transcripts may be scanned for specific keywords or topics, and combined with the SoW model to determine the consumer's characteristics. For example, a bank having a large customer service center may scan service calls for discussions involving bankruptcy. The bank could then use the SoW model with the indications from the call center transcripts to evaluate the customer.

V. APPLICABLE MARKET SEGMENTS/INDUSTRIES FOR COMMERCIAL SoW AND COMMERCIAL SoSW

A. Banks, Lenders, and Credit Providers

Banks, lenders, and credit providers (referred to collectively herein as "lenders") lend money based on a borrower's credit rating and collateral. Even when loans are secured by collateral, though, there is no guarantee that the value of the collateral will not depreciate over time to a value that is below the outstanding loan balance. While a credit rating of the borrower may be a good indicator of a borrower's willingness to repay, it is not a good indicator of borrower's future ability to repay. By predicting future spend, the commercial SoW and commercial SoSW models provide a score that is, effectively, a proxy for predicting a borrower's ability to repay.

In the acquisition stage of the customer lifecycle, lenders can use commercial SoW and/or commercial SoSW models to determine to whom they should lend, and to whom they should deny credit. The commercial models may also be used for pricing loans and other products in a dynamic way. By using the commercial models to determine whose profits and/or spend is likely to increase, for example, lenders can use the scores produced by the commercial models as search criteria to identify which existing customers should be targeted for both new and existing products. The scores may also be used to identify companies who are not yet clients who could be targeted for lender products.

In the retention stage of the customer lifecycle, lenders can use the commercial models to determine which customers should be retained. The models can also be used to segment existing customers for cross-selling purposes. Additionally, the models can be used to manage credit risk and/or exposure from existing loans. For example, if the commercial models predict that a business is undergoing or will undergo increased financial stress and/or credit risk, the lender could revoke the business's unused lines of credit.

In the disposal stage, the commercial models can be used to determine which customers should be extended settlement offers by the lender. The lender can also use the commercial models to identify which business loans are likely to default. The lender can thus sell these loans early-on to get a higher sale price. This is useful since the loan seller gets fewer cents on the dollar as the dollar as the time that lapses between loan default and sale grows longer. The lender can also use the commercial models to determine which loans should be collected in-house, and which loans should be sent out to collection agencies.

B. Investment Vehicles and Investment Vehicle Managers

Although mutual funds will be used herein as example investment vehicles, one of skill in the relevant art(s) will recognize that commercial SoW and commercial SoSW can benefit many other types of investment vehicles, such as hedge funds.

Mutual funds, for example, that invest using a so-called "top-down" approach identify stocks by first selecting industries that match certain criteria, and then zeroing in on companies in that industry that match other criteria. The other criteria may be, for example and without limitation, size, revenue growth, profits, price-earnings ratios, and revenue growth vs. expense growth. Funds that use a so-called "bottom-up" approach identify securities by zeroing in on companies that match specific criteria, without starting at the industry level. Some managers also use analyst reviews and credit agency reports, among other devices. Whether using a top-down approach, a bottom-up approach, or a combination of both, the fund managers rely on historical data. These data tend to be disjointed and are not often connected.

The commercial SoW and/or commercial SoSW models may be used to present fund managers with a simple yet robust score, which is a quantitative measure that indicates whether or not a company is expected to do well. This score may be of particular interest if the mutual fund is about to buy securities of the company. Typically, investors and fund managers use historical information. When they invest, they assume that a historical trend will continue. That is, they frequently assume that a company will continue to be profitable. However, funds and other investors, particularly those that invest in smaller companies, do not always have access to reliable and accurate historical data and to a single score that encapsulates a company's revenues, expenses, and financial stress. The commercial models provide a score that encompasses all of these.

In the acquisition stage of the customer lifecycle, mutual funds can use a score produced by the commercial models as one of the parameters to be considered when picking stocks and when determining which stocks to buy, sell, or short.

The commercial models may also be used in the retention and disposal stages. After buying stocks, money managers normally set a price target at which to sell. The stocks are sold once the price reaches that pre-set level. Alternatively, if it seems that the price will never reach that preset level or prices fall instead of rising as expected, the stock may be sold at a loss. Fund managers can use the commercial models to predict which stocks in their portfolio are likely to suffer a price fall.

In an example scenario, a mutual fund has purchased the securities of a company. The company sells its products to other companies in a certain industry. The mutual fund could use scores produced by the commercial models to predict whether or not the company's customers will be spending less in the future, thus reducing the company's revenues and possibly its share price. In addition, if a particular customer is one of the company's major customers, the mutual fund could use scores produced by the commercial model to determine and/or predict potential financial trouble at the particular customer. With such knowledge, the mutual fund could sell the company's shares before the price plummets. Alternatively, if the scores produced by the commercial models show that the particular customer will be doing better, the mutual fund could buy more shares of the company.

C. Research Analysts

A research analyst provides a rating that summarizes the analyst's opinion about the quality and/or prospects of the rated company's securities. Such a rating might be "BUY," "HOLD," or "SELL" for equity, or "A," "B," "C," or "JUNK" for debt. Whether conducting analyses that would result in a rating for debt or equity, analysts review a company's performance, management and prospects, among other things.

While it is standard practice for rated companies to provide analysts with factual historical data, the clients of such rated companies have no obligation to give the analyst any data unless the client is also rated by the same analyst. In the absence of such information, the analysts projections about the future prospects of the rated company, and any rating that is based on such projections, is pure speculation.

With the commercial SoW and/or commercial SoSW models, however, the analyst has a simple, yet comprehensive, indication of the business prospects of the customers of the rated company. With scores produced by the commercial models, therefore, the analyst is then able to provide a much more meaningful rating that provides a more accurate picture of the rated company.

As an example, an analyst follows a particular corporation. He also rates the securities issued by the corporation. The main customers of the corporation are companies in a specific industry. The corporation has issued some bonds, and plans to service those bonds with the revenues from selling to customers in the specific industry. In this scenario, which is not unique, the analyst could have access to public historical financial information from some companies in the specific industry. These historical data, however, are not forward-looking, and do not tell the analyst the prospects of the companies in the specific industry.

However, with scores produced by the commercial models, the analyst can predict whether or not the companies in the specific industry intend to increase or decrease their spend. Thus, by combining the predictive capabilities of the commercial models and the analyst's knowledge of the corporation, the analyst can issue a much more accurate and reliable rating for the securities issued by the corporation. The analyst is able to use scores produced by the commercial models to assign new ratings and change existing ratings.

D. Government Agencies, Procurement Departments, and Others that Patronize Small Businesses Government departments and agencies and large publicly traded firms are usually obliged by law or otherwise to patronize small businesses. Such patronage takes various forms, including, for example and without limitation, so-called 8(a) programs, small business set aside programs, and disadvantaged business entity programs. Once certified, a small business can bid as a sole source provider for government contracts worth several million dollars.

Certifying agencies rely on Dun & Bradstreet scores and an array of self-reported data to certify a business as, for example and without limitation, small, woman-owned, minority-owned, or a disadvantaged business entity. To be certified as a woman-owned business, for example, the certifying authority basically certifies that the business is at least 51% owned by one or more women. Such self-reported data, even when accurate, are only required to be updated every year or so. Further, these data do not have the inherent capability to provide an indication of whether the particular small business is growing or shrinking, or whether the particular industry served by such small business (the small business's revenue source) is growing or shrinking.

Thus, while such certifications might level the playing field by giving small businesses access to opportunities they might not otherwise have, they also put those buying the services (the government agencies, procurement departments, etc.) at risk. This is because most small businesses fail within the first few years, and small-business type certifications do not provide an indication of the likelihood that a particular business would continue as a going concern.

By using the commercial SoW and/or commercial SoSW models, buyers of services can determine, before awarding and/or renewing contracts, whether the vendor is on the upswing or on its last breath. Such service buyers could also use a combination of the commercial models and statistical analyses to predict the likelihood that a particular small business will remain in business.

In the acquisition stage of the customer lifecycle, the agency or procurement department can use the commercial models to determine to whom contracts should be awarded, and to whom business should be denied. Further, to the extent that service buyers require vendors that are small businesses to post performance bonds, such service buyers could also use the commercial models to determine whether or not a performance bond should be required and, if so, the amount the performance bond should be. In addition to using the commercial models as tools for determining to whom contracts should be awarded, such service buyers, when appropriate, can use scores produced by the commercial models to prepare a shortlist of who to solicit proposals from. This may occur, for example, when sending out requests for proposals that are not broadcast to everyone.

In the retention stage, agencies or procurement departments can use scores produced by the commercial models to manage their approved vendor lists. In the disposal stage, they can use scores produced by the commercial models to proactively determine which vendors to remove from their approved vendor lists.

E. Insurance Companies

Insurance companies sell businesses a product called "key man insurance." Basically, key man insurance is a life insurance policy on the key/crucial/critical people in a business. In a small business, this is usually the owner, the founder(s), or perhaps a key employee or two (all collectively referred to herein as key employee(s)). If something were to happen to these people, the business would most probably sink. With key man term life insurance, a company purchasing a life insurance policy on the key employee(s) pays the premiums. That company becomes the beneficiary of the policy. If the key employee(s) dies suddenly, the company receives the insurance payoff. In effect, the key man insurance helps the insured company to mitigate the adverse impact of losing the key employee(s). The company can use the insurance proceeds for expenses until it hires a replacement, or, if necessary, settle debts, distribute money to stakeholders, provide severance packages, and wind down the business in an orderly manner.

To price such insurance policies, insurers rely on an array of data, including the insured company's historical financials. Some insurers might even go as far as analyzing the industry that constitutes the customer base (and thus revenue source) of the company buying key man insurance. Such analyses, however, tend to be general at best. In addition, even if the insurance company wants to analyze the business prospects of the insured company's particular customers, such customers are not obligated to provide any data, let alone accurate data, to the insurance company. Consequently, insurers face significant danger of underpricing risk. In extreme cases, this information asymmetry results in outright fraud against the insurers.

With the commercial SoW and/or commercial SoSW models, insurers can reduce the danger of underpricing risk, and thus price their risk accordingly. For example, when pricing a key man policy, the insurer can ask the insured for a list of its major customers in addition to analyzing the historical financials of the insured company. With such a list, the insurer can then factor into its premium calculations the business prospects of each such customer. In extreme cases, the insurer could even refuse to provide key man insurance to a company, because it may not be reasonable to provide insurance to a company that is about to go under.

In the acquisition stage of the customer lifecycle, insurance companies can use the commercial models to decide whether or not to sell insurance to a particular company. The commercial models can also be used as a factor in determining what the insurance should be. Additionally, the commercial models can be used by the insurance company as a filter for identifying prospective clients.

In the retention stage, insurance companies can use the commercial models as a factor to decide whether to re-price the premium on a policy, and also to decide whether to increase or decrease the payout amount for a particular premium. In the disposal stage, insurance companies can use the commercial models to decide when to revoke the insurance policy for a particular client.

VI. SYSTEM IMPLEMENTATIONS

The present invention may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 32:
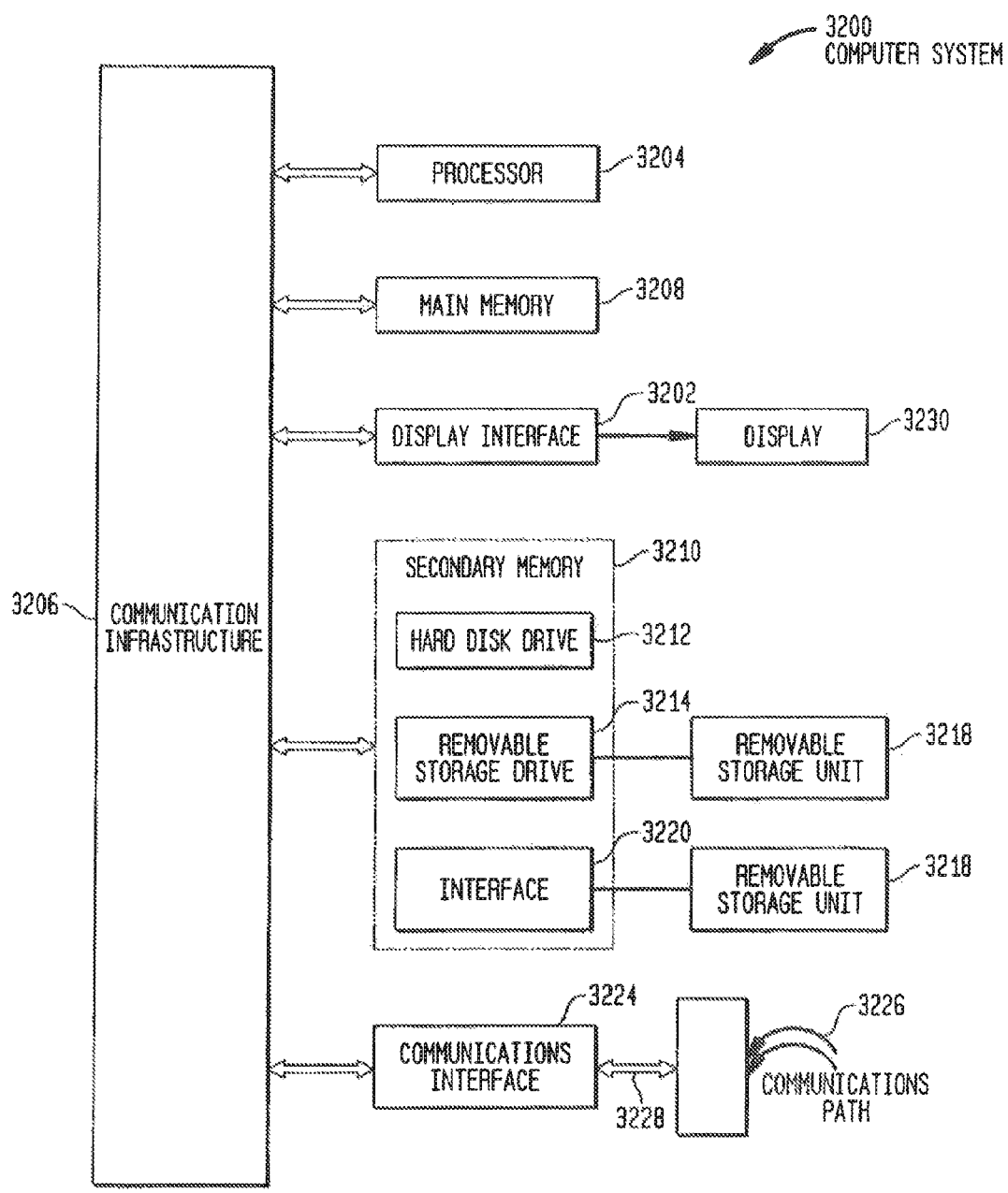
FIG. 32 is a block diagram of an exemplary computer system useful for implementing the present invention.

In fact, in one embodiment, the invention is directed toward one or more computer systems capable of carrying out the functionality described herein. An example of a computer system 3200 is shown in FIG. 32.

The computer system 3200 includes one or more processors, such as processor 3204. The processor 3204 is connected to a communication infrastructure 3206 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 3200 can include a display interface 3202 that forwards graphics, text, and other data from the communication infrastructure 3206 (or from a frame buffer not shown) for display on the display unit 3230.

Computer system 3200 also includes a main memory 3208, preferably random access memory (RAM), and may also include a secondary memory 3210. The secondary memory 3210 may include, for example, a hard disk drive 3212 and/or a removable storage drive 3214, representing a floppy disk drive, a magnetic tape drive, an optical disk drive, etc. The removable storage drive 3214 reads from and/or writes to a removable storage unit 3218 in a well known manner. Removable storage unit 3218 represents a floppy disk, magnetic tape, optical disk, etc. which is read by and written to by removable storage drive 3214. As will be appreciated, the removable storage unit 3218 includes a computer usable storage medium having stored therein computer software and/or data.

In alternative embodiments, secondary memory 3210 may include other similar devices for allowing computer programs or other instructions to be loaded into computer system 3200. Such devices may include, for example; a removable storage unit 3218 and an interface 3220. Examples of such may include a program cartridge and cartridge interface (such as that found in video game devices), a removable memory chip (such as an erasable programmable read only memory (EPROM), or programmable read only memory (PROM)) and associated socket, and other removable storage units 3218 and interfaces 3220, which allow software and data to be transferred from the removable storage unit 3218 to computer system 3200.

Computer system 3200 may also include a communications interface 3224. Communications interface 3224 allows software and data to be transferred between computer system 3200 and external devices. Examples of communications interface 3224 may include a modem, a network interface (such as an Ethernet card), a communications port, a Personal Computer Memory Card International Association (PCMCIA) slot and card, etc. Software and data transferred via communications interface 3224 are in the form of signals 3228 which may be electronic, electromagnetic, optical or other signals capable of being received by communications interface 3224. These signals 3228 are provided to communications interface 3224 via a communications path (e.g., channel) 3226. This channel 3226 carries signals 3228 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 3214, a hard disk installed in hard disk drive 3212, and signals 3228. These computer program products provide software to computer system 3200. The invention is directed to such computer program products.

Computer programs (also referred to as computer control logic) are stored in main memory 3208 and/or secondary memory 3210. Computer programs may also be received via communications interface 3224. Such computer programs, when executed, enable the computer system 3200 to perform the features of the present invention, as discussed herein. In particular, the computer programs, when executed, enable the processor 3204 to perform the features of the present invention. Accordingly, such computer programs represent controllers of the computer system 3200.

In an embodiment where the invention is implemented using software, the software may be stored in a computer program product and loaded into computer system 3200 using removable storage drive 3214, hard drive 3212 or communications interface 3224. The control logic (software), when executed by the processor 3204, causes the processor 3204 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VII. CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method comprising:
    modeling, by a financial assessment computer-based system, industry spending patterns, wherein the computer-based system comprises a computer processor and a tangible, non-transitory memory and wherein the modeling comprises:
        identifying the cost of goods sold and operating expenses;
        at least one of identifying the cardable operating expenses from the operating expenses and identifying a cardable operating expenses ratio from aggregate corporate data;
        at least one of summing the cardable operating expenses with the cost of goods sold and summing the cost of goods sold with the product of operating expenses and the cardable operating expenses ratio;
    estimating, by the financial assessment computer-based system, a commercial size of spending wallet of a company based on, at least, known financial statement data of the company, total known business spending of the company, and the model of industry spending patterns, and wherein the model of industry spending patterns is used to infer financial statement data and spending data that is not known.

2. The method of claim 1, further comprising issuing a corporate rating based on at least the commercial size of spending wallet of the company.

3. The method of claim 2, wherein the corporate rating is issued for the company.

4. The method of claim 3, wherein the issuing further comprises issuing a corporate rating based on at least the commercial size of spending wallet of the company and historical financial information of the company.

5. The method of claim 2, wherein the company is a customer of a provider, and the corporate rating is issued for the provider.

6. The method of claim 5, Wherein the issuing further comprises issuing a corporate rating for the provider based on at least the commercial size of spending wallet of the company and historical financial information of the provider.

7. The method of claim 2, wherein the issuing further comprises updating, by the financial assessment computer-based system, an existing corporate rating based on at least the commercial size of spending wallet of the company.

8. The method of claim 1, wherein the estimating further comprises outputting, by the financial assessment computer-based system, the commercial size of spending wallet as a score.

9. A system comprising:
    a computer processor configured for financial assessment; and
    a tangible, non-transitory computer-readable medium having instructions stored thereon that, in response to execution by the computer processor, cause the computer processor to perform operations comprising:

modeling, by the computer processor, industry spending patterns, wherein the modeling comprises:
  identifying the cost of goods sold and operating expenses;
  at least one of identifying the cardable operating expenses from the operating expenses and identifying a cardable operating expenses ratio from aggregate corporate data;
  at least one of summing the cardable operating expenses with the cost of goods sold and summing the cost of goods sold with the product of operating expenses and the cardable operating expenses ratio;
estimating, by the computer processor, a commercial size of spending wallet of a company based on, at least, known financial statement data of the company, total known business spending of the company, and the model of industry spending patterns, and wherein the model of industry spending patterns is used to infer financial statement data and spending data that is not known.

10. The system of claim 9, wherein the operations further comprise issuing a corporate rating based on at least the commercial size of spending wallet of the company.

11. The system of claim 10, wherein the corporate rating is issued for the company.

12. The system of claim 10, wherein the issuing a corporate rating is further based upon at least one of the commercial size of spending wallet of the company and historical financial information of the company.

13. The system of claim 10, wherein the company is a customer of a provider, and the corporate rating is issued for the provider.

14. The system of claim 13, wherein the issuing a corporate rating is further based upon at least the commercial size of spending wallet of the company and historical financial information of the provider.

15. The system of claim 10, wherein the operations further comprise updating an existing corporate rating based on at least the commercial size of spending wallet of the company.

16. The system of claim 10, wherein the operations further comprise outputting the commercial size of spending wallet as a score.

17. An article of manufacture including a non-transitory computer-readable medium having instructions stored thereon that, in response to execution by a computing device configured for financial assessment, cause the computing device to perform operations comprising:
  modeling, by the computing device, industry spending patterns, wherein the modeling comprises:
    identifying the cost of goods sold and operating expenses;
    at least one of identifying the cardable operating expenses from the operating expenses and identifying a cardable operating expenses ratio from aggregate corporate data;
    at least one of summing the cardable operating expenses with the cost of goods sold and summing the cost of goods sold with the product of operating expenses and the cardable operating expenses ratio;
  estimating, by the computing device, a commercial size of spending wallet of a company based on, at least, known financial statement data of the company, total known business spending of the company, and the model of industry spending patterns, and wherein the model of industry spending patterns is used to infer financial statement data and spending data that is not known.

18. The article of manufacture of claim 17, wherein the operations further comprise issuing a corporate rating based on at least the commercial size of spending wallet of the company.

19. The article of manufacture of claim 18, wherein the corporate rating is issued for the company.

20. The article of manufacture of claim 18, wherein the issuing a corporate rating is further based upon at least one of the commercial size of spending wallet of the company and historical financial information of the company.

* * * * *